(12) United States Patent
Lee et al.

(10) Patent No.: US 11,885,930 B2
(45) Date of Patent: Jan. 30, 2024

(54) OPTICAL LENS ASSEMBLY AND PHOTOGRAPHING MODULE

(71) Applicant: NEWMAX TECHNOLOGY CO., LTD., Taichung (TW)

(72) Inventors: Chun-Sheng Lee, Taichung (TW); Chi-Chang Wang, Taichung (TW)

(73) Assignee: NEWMAX TECHNOLOGY CO., LTD., Taichung (TW)

(*) Notice: Subject to any disclaimer, the term of this patent is extended or adjusted under 35 U.S.C. 154(b) by 176 days.

(21) Appl. No.: 17/498,758

(22) Filed: Oct. 12, 2021

(65) Prior Publication Data

US 2023/0047080 A1    Feb. 16, 2023

(30) Foreign Application Priority Data

Jul. 30, 2021    (TW) .................... 110128055

(51) Int. Cl.
| | | |
|---|---|---|
| *G02B 13/00* | (2006.01) | |
| *G02B 5/20* | (2006.01) | |
| *G02B 9/12* | (2006.01) | |
| G02B 27/00 | (2006.01) | |

(52) U.S. Cl.
CPC ........... *G02B 13/0035* (2013.01); *G02B 5/20* (2013.01); *G02B 9/12* (2013.01); *G02B 27/0025* (2013.01)

(58) Field of Classification Search
CPC .......... G02B 27/646; G02B 7/09; G02B 7/08; G02B 13/0035; G02B 9/12; G02B 15/143; G02B 27/0025; G02B 9/16; G02B 13/008; G02B 9/14; G03B 3/10; G03B 5/00; G03B 2205/0007; G03B 2205/0069; G03B 13/36
USPC ........................................................ 359/557
See application file for complete search history.

(56) References Cited

U.S. PATENT DOCUMENTS

| | | | | |
|---|---|---|---|---|
| 2004/0212901 | A1* | 10/2004 | Nanba ................ | G02B 13/0035 359/785 |
| 2007/0217033 | A1* | 9/2007 | Saito .................. | G02B 13/0035 359/785 |
| 2010/0157443 | A1* | 6/2010 | Goto ...................... | G02B 13/04 359/716 |
| 2016/0223784 | A1* | 8/2016 | Liu ..................... | G02B 13/0035 |
| 2018/0031806 | A1* | 2/2018 | Lai .......................... | G02B 5/005 |

OTHER PUBLICATIONS

Gross et al. Handbook of Optical Systems, 2007, vol. 3: Aberration theory and Correction of Optical Systems. pp. 377-379 (Year: 2007).*

* cited by examiner

*Primary Examiner* — Alicia M Harrington
(74) *Attorney, Agent, or Firm* — Bruce Stone LLP; Joseph A. Bruce

(57) ABSTRACT

An optical lens assembly includes, in order from the object side to the image side: a stop, a first lens, a second lens, a third lens, and an IR band-pass filter, wherein half of a maximum view angle (field of view) of the optical lens assembly is HFOV, a radius of curvature of an image-side surface of the third lens is R6, a focal length of the optical lens assembly is f, and following condition is satisfied: −6.83<HFOV/(R6/f)<44.10, which is favorable to the thinning and large field of view of the lens assembly.

19 Claims, 19 Drawing Sheets

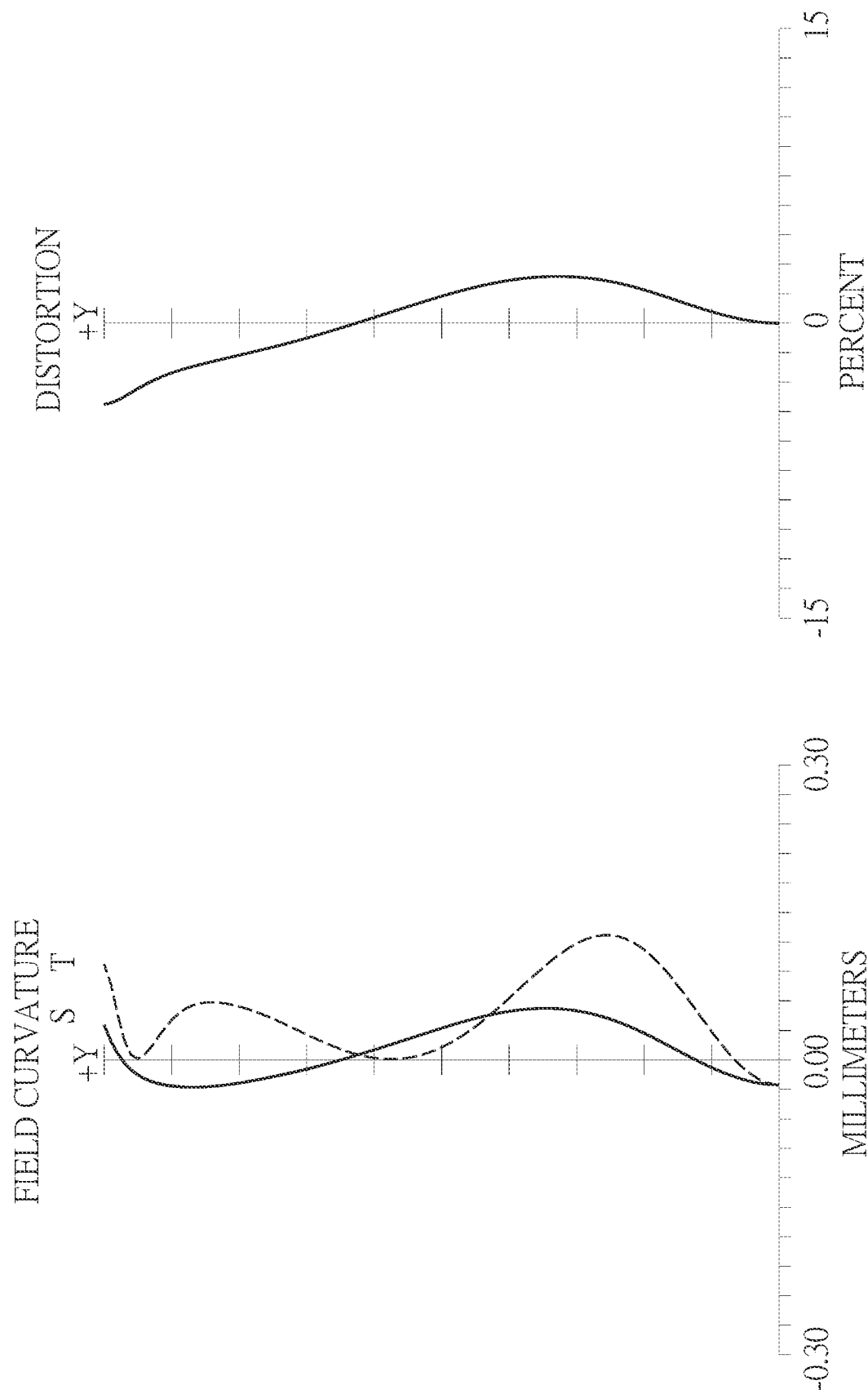

OPTICAL LENS ASSEMBLY AND PHOTOGRAPHING MODULE

BACKGROUND

Field of the Invention

The present invention relates to a lens assembly, and more particularly to an optical lens assembly and photographing module applicable to electronic products.

Description of Related Art

In recent years, three dimensional (3D) sensing technology has been developing rapidly, especially in mobile phone applications. Time of flight (TOF) photographing module is the lens assembly used by 3D sensing technology and is a technique for computing the rebound time of light, infrared ray and laser to calculate the distance between objects and the emission source.

In addition to be used in the field of infrared receiving and sensing of the game machine, in recent years, infrared optical lens assembly has also been used in mobile phones, and in order to improve the sensing effect, sensor with higher image resolution has become the mainstream for receiving infrared wavelength at present. Wherein the optical lens assembly used in the game machine usually has a longer photographing module length and lower resolution, so that it is not good for portable product, such as, mobile phones.

The present invention mitigates and/or obviates the aforementioned disadvantages.

SUMMARY

The primary objective of the present invention is to provide an optical lens assembly and photographing module. When a specific condition is satisfied, the optical lens assembly of the present invention can satisfy the objective of miniaturization and improve the image quality Therefore, an optical lens assembly in accordance with the present invention comprises, in order from an object side to an image side: a stop; a first lens with positive refractive power, comprising an object-side surface and an image-side surface, the object-side surface of the first lens being convex near an optical axis and the image-side surface of the first lens being convex near the optical axis, and the object-side surface and the image-side surface of the first lens being aspheric; a second lens with refractive power, comprising an object-side surface and an image-side surface, the object-side surface of the second lens being concave near the optical axis and the image-side surface of the second lens being convex near the optical axis, and the object-side surface and the image-side surface of the second lens being aspheric; a third lens with positive refractive power, comprising an object-side surface and an image-side surface, the object-side surface of the third lens being convex near the optical axis, and the object-side surface and the image-side surface of the third lens being aspheric; and an IR band-pass filter.

Wherein half of a maximum view angle (field of view) of the optical lens assembly is HFOV, a radius of curvature of the image-side surface of the third lens is R6, a focal length of the optical lens assembly is f, and following condition is satisfied: $-6.83°<HFOV/(R6/f)<44.10°$.

Preferably, the optical lens assembly has a total of three lenses with refractive power.

The present invention has the following effect: if the above three lenses with refractive power satisfy the condition $-6.83<HFOV/(R6/f)<44.10$, it is favorable to the thinning and large field of view of the lens assembly. Preferably, following condition can be satisfied: $-6.27°<HFOV/(R6/f)<43.0°$.

Preferably, a radius of curvature of the object-side surface of the first lens is R1, a radius of curvature of the object-side surface of the second lens is R3, and following condition is satisfied: $-8.68<R1/R3<-3.67$, which can reduce the spherical aberration and astigmatism of the optical lens assembly effectively. Preferably, following condition can be satisfied: $-7.96<R1/R3<-4.13$.

Preferably, a radius of curvature of the image-side surface of the first lens is R2, a radius of curvature of the object-side surface of the second lens is R3, and following condition is satisfied: $4.12<R2/R3<30.18$, which can reduce the spherical aberration and astigmatism of the optical lens assembly effectively. Preferably, following condition can be satisfied: $4.64<R2/R3<27.66$.

Preferably, the radius of curvature of the image-side surface of the first lens is R2, an entrance pupil diameter of the optical lens assembly is EPD, and following condition is satisfied: $-10.42<R2/EPD<-2.00$, so as to improve the image quality of the lens assembly. Preferably, following condition can be satisfied: $-9.55<R2/EPD<-2.24$.

Preferably, a focal length of the second lens is f2, a central thickness of the second lens along the optical axis is CT2, and following condition is satisfied: $-11.48<f2/CT2<30.11$, so that the relationship between the thickness and the focal length of the second lens is balanced effectively to achieve the effect of thinning and improve the imaging quality. Preferably, following condition can be satisfied: $-10.53<f2/CT2<33.87$.

Preferably, a central thickness of the third lens along the optical axis is CT3, a radius of curvature of the object-side surface of the third lens is R5, and following condition is satisfied: $0.26<CT3/R5<2.08$, which can control the relationship between the surface shape of the object-side surface and the thickness of the third lens, it is favorable to achieve a proper balance between miniaturization and the yield of assembly. Preferably, following condition can be satisfied: $0.29<CT3/R5<1.91$.

Preferably, a distance from the object-side surface of the first lens to the image-side surface of the third lens along the optical axis is TD, a distance from the image-side surface of the second lens to the object-side surface of the third lens along the optical axis is T23, and following condition is satisfied: $46.90<TD/T23<103.89$, which is favorable to achieve an appropriate balance between miniaturization and lens spacing. Preferably, following condition can be satisfied: $52.76<TD/T23<95.23$.

Preferably, the optical lens assembly has the maximum view angle (field of view) FOV, the focal length of the optical lens assembly is f, and following condition is satisfied: $30.09°/mm<FOV/f<49.43°/mm$, which can effectively collect light in large angle and increase the image receiving area. Preferably, following condition can be satisfied: $33.86°/mm<FOV/f<45.31°/mm$ Preferably, half of the maximum view angle (field of view) of the optical lens assembly is HFOV, the radius of curvature of the object-side surface of the second lens is R3, and following condition is satisfied: $-115.99°/mm<HFOV/R3<-43.33°/mm$, which can effectively collect light in large angle and increase the image receiving area. Preferably, following condition can be satisfied: $-106.33°/mm<HFOV/R3<-48.74°/mm$ Preferably, the focal length of the optical lens assembly is f, a distance from the object-side surface of the first lens to an image plane along the optical axis is TL, the central thickness of the third lens along the optical axis is CT3, and following condition is satisfied: 4.81 mm<f*TL/CT3<16.67 mm, which can effectively collect light in large angle and increase the image receiving area, while ensure that the third lens has better molding. Preferably, following condition can be satisfied: 5.41 mm<f*TL/CT3<15.28 mm.

Preferably, the radius of curvature of the image-side surface of the first lens is R2, the radius of curvature of the object-side surface of the third lens is R5, and following condition is satisfied: −17.40<R2/R5<−2.11, which can reduce the spherical aberration and astigmatism of the optical lens assembly effectively. Preferably, following condition can be satisfied: −15.95<R2/R5<−2.38.

Preferably, the radius of curvature of the image-side surface of the first lens is R2, the radius of curvature of the image-side surface of the third lens is R6, and following condition is satisfied: −2.95<R2/R6<0.55, which can reduce the spherical aberration and astigmatism of the optical lens assembly effectively. Preferably, following condition can be satisfied: −2.70<R2/R6<0.50.

Preferably, the radius of curvature of the image-side surface of the third lens is R6, a focal length of the third lens is f3, and following condition is satisfied: −24.08<R6/f3<196.86, which is favorable to the correction of the high order aberrations and astigmatism of the assembly. Preferably, following condition can be satisfied: −22.07<R6/f3<180.46.

Preferably, the focal length of the third lens is f3, the central thickness of the third lens along the optical axis is CT3, and following condition is satisfied: 0.00<f3/CT3<19.85, so that the relationship between the thickness and the focal length of the third lens is balanced effectively to achieve the effect of thinning and improve the imaging quality. Preferably, following condition can be satisfied: 0.97<f3/CT3<18.19.

Preferably, the central thickness of the third lens along the optical axis is CT3, the central thickness of the second lens along the optical axis is CT2, and following condition is satisfied: 0.86<CT3/CT2<6.25, so that the thicknesses of the second lens and the third lens can be balanced, which is favorable to achieve a proper balance between miniaturization and the lens formability. Preferably, following condition can be satisfied: 0.97<CT3/CT2<5.73.

Preferably, the optical lens assembly has the maximum view angle (field of view) FOV, the distance from the object-side surface of the first lens to the image plane along the optical axis is TL, and following condition is satisfied: 16.46°/mm<FOV/TL<28.47°/mm, which can effectively collect light in large angle light, increase the image receiving area, and achieve the effect of thinning. Preferably, following condition can be satisfied: 18.52°/mm<FOV/TL<26.1°/mm.

Preferably, half of the maximum view angle (field of view) of the optical lens assembly is HFOV, the radius of curvature of the object-side surface of the first lens is R1, and following condition is satisfied: 16.11°/mm<HFOV/R1<40.24°/mm, which can effectively collect light in large angle and increase the image receiving area. Preferably, following condition can be satisfied: 18.1°/mm<HFOV/R1<36.88°/mm.

Preferably, the focal length of the second lens is f2, the distance from the object-side surface of the first lens to the image plane along the optical axis is TL, half of the maximum view angle (field of view) of the optical lens assembly is HFOV, and following condition is satisfied: −12.36 mm'<f2*TL/cos(HFOV)<78.43 mm$^2$, which is favorable to the thinning of the lens assembly and expand the range of image reception. Preferably, following condition can be satisfied: −11.33 mm$^2$<f2*TL/cos(HFOV)<71.89 mm$^2$.

A photographing module in accordance with the present invention comprises a lens barrel, the above optical lens assembly disposed in the lens barrel, and an image sensor disposed on the image plane of the optical lens assembly.

For each of the above optical lens assemblies or the photographing module, wherein the radius of curvature of the object-side surface of the first lens is R1, the radius of curvature of the object-side surface of the third lens is R5, and following condition is satisfied: 1.55<R1/R5<4.75, which can reduce the spherical aberration and astigmatism of the optical lens assembly effectively.

For each of the above optical lens assemblies or the photographing module, wherein the focal length of the third lens is f3, the entrance pupil diameter of the optical lens assembly is EPD, and following condition is satisfied: 0.00<f3/EPD<6.31, which is favorable to improve the image quality of the optical lens assembly.

For each of the above optical lens assemblies or the photographing module, wherein a focal length of the first lens is f1, the focal length of the third lens is f3, and following condition is satisfied: 0.34<f1/f3<3.1, which is favorable to reduce the sensitivity and the aberration of the system.

For each of the above optical lens assemblies or the photographing module, wherein a distance from the image-side surface of the first lens to the object-side surface of the second lens along the optical axis is T12, the central thickness of the second lens along the optical axis is CT2, and following condition is satisfied: 0.93<T12/CT2<2.67, which can adjust the lens thickness and lens spacing, so as to reduce the effect of manufacturing tolerance on image quality.

For each of the above optical lens assemblies or the photographing module, wherein a central thickness of the first lens along the optical axis is CT1, the central thickness of the second lens along the optical axis is CT2, and following condition is satisfied: 1.0<CT1/CT2<3.13, so that the thicknesses of the first lens and the second lens can be balanced to achieve better formability.

For each of the above optical lens assemblies or the photographing module, wherein the distance from the image-side surface of the second lens to the object-side surface of the third lens along the optical axis is T23, the central thickness of the third lens along the optical axis is CT3, and following condition is satisfied: 0.00<T23/CT3<0.09, which can adjust the lens thickness and lens spacing, so as to reduce the effect of manufacturing tolerance on image quality.

For each of the above optical lens assemblies or the photographing module, wherein the focal length of the first lens is f1, the focal length of the second lens is f2, and following condition is satisfied: −2.36<f1/f2<0.62, which is favorable to reduce the sensitivity and the aberration of the system.

The present invention will be presented in further details from the following descriptions with the accompanying drawings, which show, for purpose of illustrations only, the preferred embodiments in accordance with the present invention.

BRIEF DESCRIPTION OF THE DRAWINGS

FIG. 4B shows the image plane curve and the distortion curve of the fourth embodiment of the present invention;

DETAILED DESCRIPTION

Figure 1A:
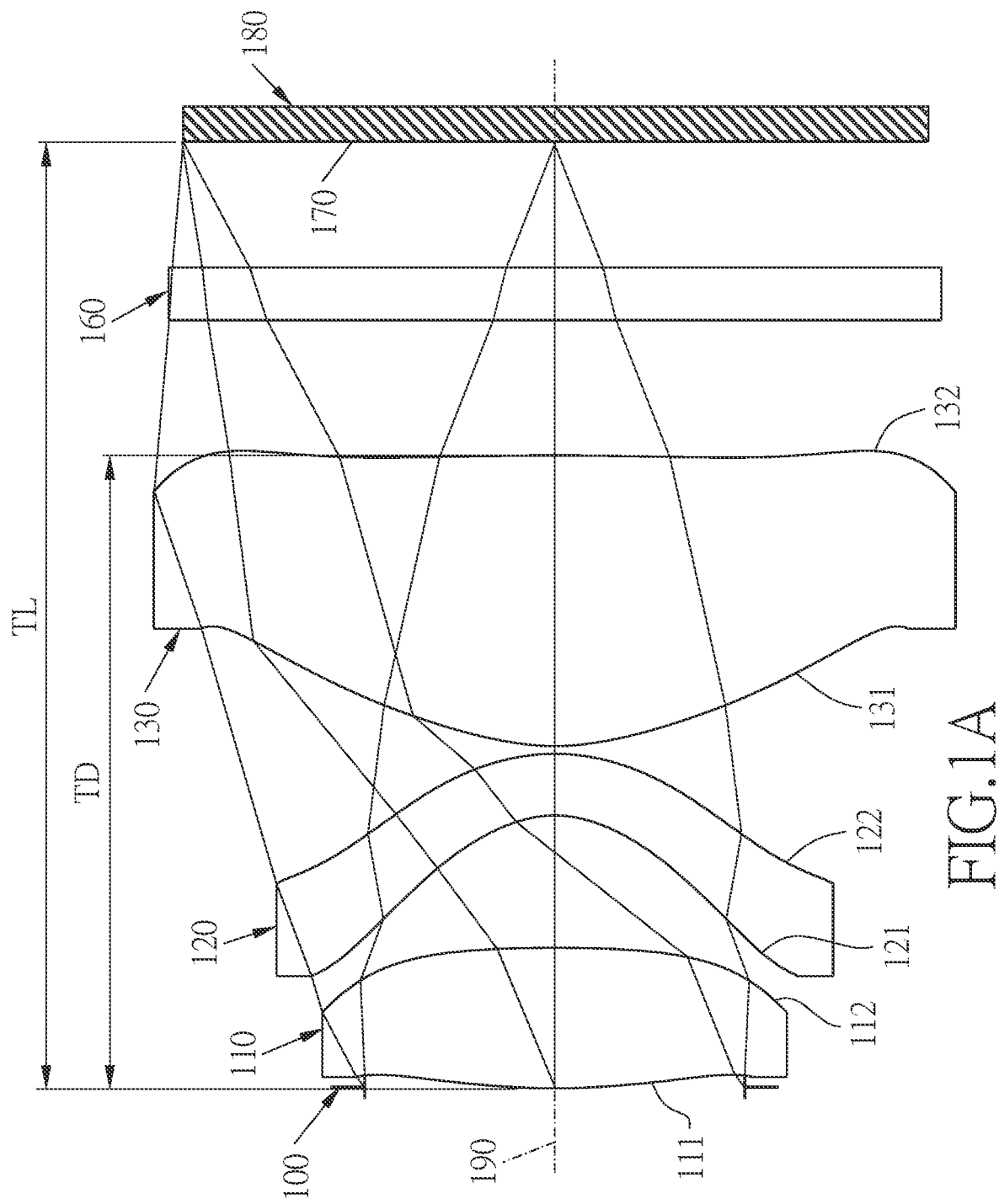
FIG. 1A shows an optical lens assembly in accordance with a first embodiment of the present invention.
Figure 1B:
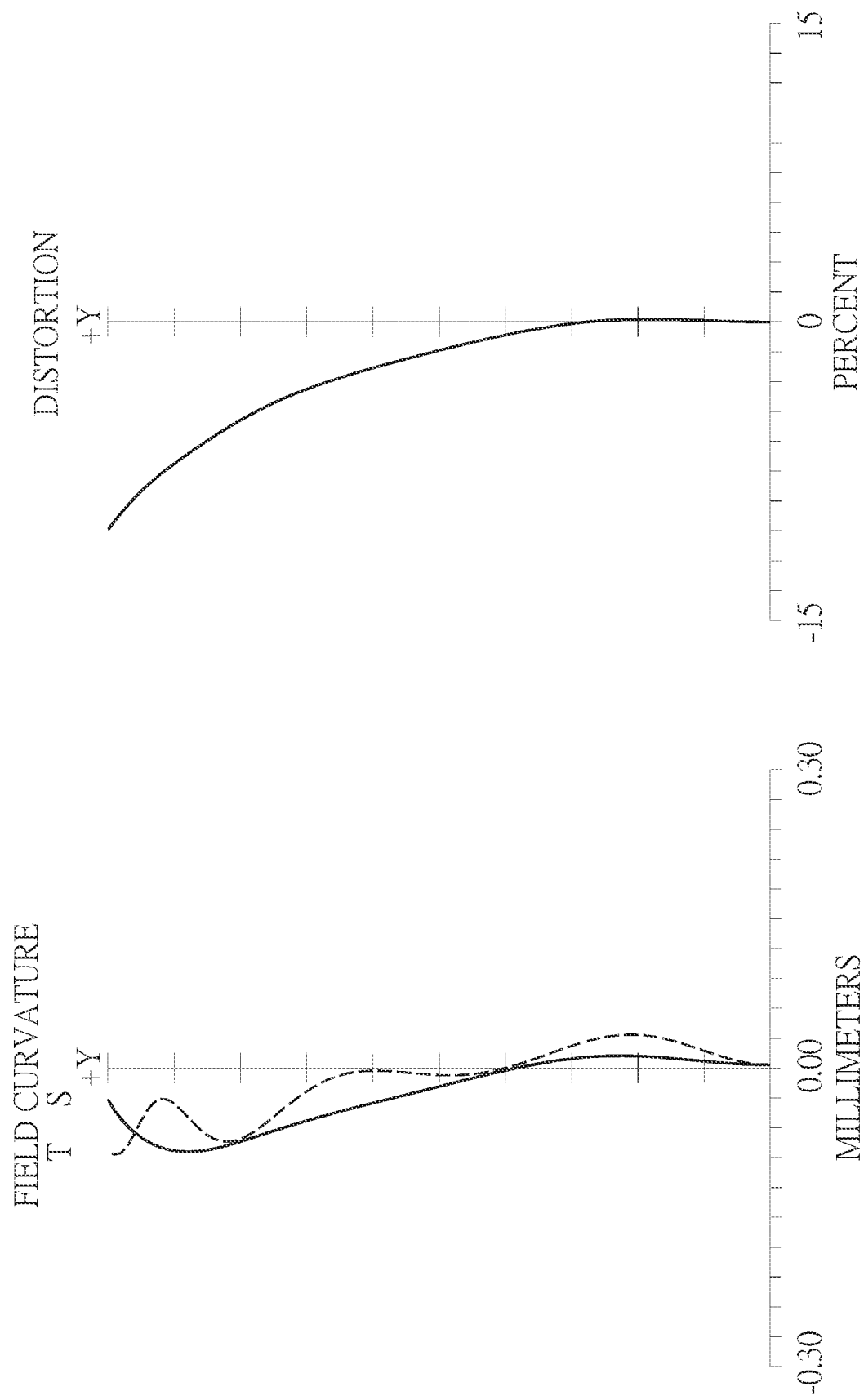
FIG. 1B shows the image plane curve and the distortion curve of the first embodiment of the present invention.

Referring to FIGS. 1A and 1B, FIG. 1A shows an optical lens assembly in accordance with a first embodiment of the present invention, and FIG. 1B shows, in order from left to right, the image plane curve and the distortion curve of the first embodiment of the present invention. An optical lens assembly in accordance with the first embodiment of the present invention comprises, in order from an object side to an image side along an optical axis 190: a stop 100, a first lens 110, a second lens 120, a third lens 130, an IR band-pass filter 160, and an image plane 170. The optical lens assembly is provided with an image sensor 180. Wherein the optical lens assembly has a total of three lenses with refractive power, but not limited to this. The stop 100 is disposed between an object and the first lens 110. The image sensor 180 is disposed on the image plane 170.

The first lens 110 with positive refractive power, comprising an object-side surface 111 and an image-side surface 112, the object-side surface 111 of the first lens 110 being convex near the optical axis 190 and the image-side surface 112 of the first lens 110 being convex near the optical axis 190, the object-side surface 111 and the image-side surface 112 of the first lens 110 are aspheric, and the first lens 110 is made of plastic material.

The second lens 120 with negative refractive power, comprising an object-side surface 121 and an image-side surface 122, the object-side surface 121 of the second lens 120 being concave near the optical axis 190 and the image-side surface 122 of the second lens 120 being convex near the optical axis 190, the object-side surface 121 and the image-side surface 122 of the second lens 120 are aspheric, and the second lens 120 is made of plastic material.

The third lens 130 with positive refractive power, comprising an object-side surface 131 and an image-side surface 132, the object-side surface 131 of the third lens 130 being convex near the optical axis 190 and the image-side surface 132 of the third lens 130 being convex near the optical axis 190, the object-side surface 131 and the image-side surface 132 of the third lens 130 are aspheric, and the third lens 130 is made of plastic material.

The IR band-pass filter 160 made of glass is located between the third lens 130 and the image plane 170 and has no influence on the focal length of the optical lens assembly. The present embodiment selects a filter which is available in the light wavelength range of 940 nm±30 nm, but not limited to this.

The equation for the aspheric surface profiles of the respective lenses of the first embodiment is expressed as follows:

$$z(h) = \frac{ch^2}{1+\left[1-(k+1)c^2h^2\right]^{0.5}} + \sum (A_i)\cdot(h^i)$$

wherein:

z represents the value of a reference position with respect to a vertex of the surface of a lens and a position with a height h along the optical axis 190;

c represents a paraxial curvature equal to 1/R (R: a paraxial radius of curvature);

h represents a vertical distance from the point on the curve of the aspheric surface to the optical axis 190;

k represents the conic constant;

$A_i$, . . . represent the i-order aspheric coefficients.

In the first embodiment of the present optical lens assembly, a focal length of the optical lens assembly is f, a f-number of the optical lens assembly is Fno, the optical lens assembly has a maximum view angle FOV, an entrance pupil diameter of the optical lens assembly is EPD, and following conditions are satisfied: f=2.07 mm; Fno=1.36; FOV=77.94 degrees; EPD=1.53 mm and FOV/f=37.62 (degrees/mm).

In the first embodiment of the present optical lens assembly, half of the maximum view angle (field of view) of the optical lens assembly is HFOV, a radius of curvature of the image-side surface 132 of the third lens 130 is R6, the focal length of the optical lens assembly is f, and following condition is satisfied: HFOV/(R6/f)=−5.51 degrees.

In the first embodiment of the present optical lens assembly, a radius of curvature of the object-side surface 111 of the first lens 110 is R1, a radius of curvature of the object-side surface 121 of the second lens 120 is R3, and following condition is satisfied: R1/R3=−6.76.

In the first embodiment of the present optical lens assembly, a radius of curvature of the image-side surface 112 of the first lens 110 is R2, the radius of curvature of the object-side surface 121 of the second lens 120 is R3, and following condition is satisfied: R2/R3=14.88.

In the first embodiment of the present optical lens assembly, the radius of curvature of the image-side surface 112 of the first lens 110 is R2, the entrance pupil diameter of the optical lens assembly is EPD, and following condition is satisfied: R2/EPD=−4.35.

In the first embodiment of the present optical lens assembly, a focal length of the second lens 120 is f2, a central thickness of the second lens 120 along the optical axis 190 is CT2, and following condition is satisfied: f2/CT2=−8.35.

In the first embodiment of the present optical lens assembly, a central thickness of the third lens 130 along the optical axis 190 is CT3, a radius of curvature of the object-side surface 131 of the third lens 130 is R5, and following condition is satisfied: CT3/R5=1.21.

In the first embodiment of the present optical lens assembly, a distance from the object-side surface 111 of the first lens 110 to the image-side surface 132 of the third lens 130 along the optical axis 190 is TD, a distance from the image-side surface 122 of the second lens 120 to the object-side surface 131 of the third lens 130 along the optical axis 190 is T23, and following condition is satisfied: TD/T23=84.58.

In the first embodiment of the present optical lens assembly, half of the maximum view angle (field of view) of the optical lens assembly is HFOV, the radius of curvature of the object-side surface 121 of the second lens 120 is R3, and following condition is satisfied: HFOV/R3=−87.17 (degrees/mm).

In the first embodiment of the present optical lens assembly, the focal length of the optical lens assembly is f, a distance from the object-side surface 111 of the first lens 110 to the image plane 170 along the optical axis 190 is TL, the central thickness of the third lens 130 along the optical axis 190 is CT3, and following condition is satisfied: f*TL/CT3=6.75 mm.

In the first embodiment of the present optical lens assembly, the radius of curvature of the image-side surface 112 of the first lens 110 is R2, the radius of curvature of the object-side surface 131 of the third lens 130 is R5, and following condition is satisfied: R2/R5=−6.94.

In the first embodiment of the present optical lens assembly, the radius of curvature of the image-side surface 112 of the first lens 110 is R2, the radius of curvature of the image-side surface 132 of the third lens 130 is R6, and following condition is satisfied: R2/R6=0.45.

In the first embodiment of the present optical lens assembly, the radius of curvature of the image-side surface 132 of the third lens 130 is R6, a focal length of the third lens 130 is f3, and following condition is satisfied: R6/f3=−9.76.

In the first embodiment of the present optical lens assembly, the focal length of the third lens 130 is f3, the central thickness of the third lens 130 along the optical axis 190 is CT3, and following condition is satisfied: f3/CT3=1.30.

In the first embodiment of the present optical lens assembly, the central thickness of the third lens 130 along the optical axis 190 is CT3, the central thickness of the second lens 120 along the optical axis 190 is CT2, and following condition is satisfied: CT3/CT2=4.71.

In the first embodiment of the present optical lens assembly, the optical lens assembly has the maximum view angle FOV, the distance from the object-side surface 111 of the first lens 110 to the image plane 170 along the optical axis 190 is TL, and following condition is satisfied: FOV/TL=20.68°/mm.

In the first embodiment of the present optical lens assembly, half of the maximum view angle (field of view) of the optical lens assembly is HFOV, the radius of curvature of the object-side surface 111 of the first lens 110 is R1, and following condition is satisfied: HFOV/R1=25.78 (degrees/mm).

In the first embodiment of the present optical lens assembly, the focal length of the second lens 120 is f2, the distance from the object-side surface 111 of the first lens 110 to the image plane 170 along the optical axis 190 is TL, and following condition is satisfied: f2*TL/cos(HFOV)=−9.95 mm$^2$.

In the first embodiment of the present optical lens assembly, the radius of curvature of the object-side surface 111 of the first lens 110 is R1, the radius of curvature of the object-side surface 131 of the third lens 130 is R5, and following condition is satisfied: R1/R5=3.15.

In the first embodiment of the present optical lens assembly, the focal length of the third lens 130 is f3, the entrance pupil diameter of the optical lens assembly is EPD, and following condition is satisfied: f3/EPD=0.98.

In the first embodiment of the present optical lens assembly, a focal length of the first lens 110 is f1, the focal length of the third lens 130 is f3, and following condition is satisfied: f1/f3=2.29.

In the first embodiment of the present optical lens assembly, a distance from the image-side surface 112 of the first lens 110 to the object-side surface 121 of the second lens 120 along the optical axis 190 is T12, the central thickness of the second lens 120 along the optical axis 190 is CT2, and following condition is satisfied: T12/CT2=2.14.

In the first embodiment of the present optical lens assembly, a central thickness of the first lens 110 along the optical axis 190 is CT1, the central thickness of the second lens 120 along the optical axis 190 is CT2, and following condition is satisfied: CT1/CT2=2.28.

In the first embodiment of the present optical lens assembly, the distance from the image-side surface 122 of the second lens 120 to the object-side surface 131 of the third lens 130 along the optical axis 190 is T23, the central thickness of the third lens 130 along the optical axis 190 is CT3, and following condition is satisfied: T23/CT3=0.03.

In the first embodiment of the present optical lens assembly, the focal length of the first lens 110 is f1, the focal length of the second lens 120 is f2, and following condition is satisfied: f1/f2=−1.68.

The detailed optical data of the first embodiment is shown in table 1, and the aspheric surface data is shown in table 2.

TABLE 1

Embodiment 1
f(focal length) = 2.07 mm, Fno = 1.36, FOV = 77.94 deg.

| surface | | Curvature Radius | Thickness/gap | Material | Index (nd) | Abbe # (vd) | Focal length |
|---|---|---|---|---|---|---|---|
| 0 | object | infinity | 1000000 | | | | |
| 1 | stop | infinity | −0.005 | | | | |
| 2 | Lens 1 | 3.023 (ASP) | 0.560 | plastic | 1.643 | 22.5 | 3.44 |
| 3 | | −6.654 (ASP) | 0.527 | | | | |
| 4 | Lens 2 | −0.447 (ASP) | 0.246 | plastic | 1.643 | 22.5 | −2.05 |
| 5 | | −0.836 (ASP) | 0.030 | | | | |
| 6 | Lens 3 | 0.959 (ASP) | 1.158 | plastic | 1.643 | 22.5 | 1.50 |

TABLE 1-continued

Embodiment 1
f(focal length) = 2.07 mm, Fno = 1.36, FOV = 77.94 deg.

| surface | | Curvature Radius | Thickness/gap | Material | Index (nd) | Abbe # (vd) | Focal length |
|---|---|---|---|---|---|---|---|
| 7 | | 14.641 (ASP) | 0.539 | | | | |
| 8 | IR band-pass filter | infinity | 0.210 | glass | 1.517 | 64.2 | |
| 9 | | infinity | 0.5 | | | | |
| 10 | Image plane | infinity | — | | | | |

Note:
reference wavelength is 940 nm

TABLE 2

| | Aspheric Coefficients | | | | | |
|---|---|---|---|---|---|---|
| surface | 2 | 3 | 4 | 5 | 6 | 7 |
| K: | −1.0065E+00 | 3.9351E+01 | −2.7047E+00 | −8.7547E−01 | −9.8976E+00 | −7.6635E+01 |
| A2: | 0.0000E+00 | 0.0000E+00 | 0.0000E+00 | 0.0000E+00 | 0.0000E+00 | 0.0000E+00 |
| A4: | 2.9166E−02 | −1.4488E−01 | −4.2205E−01 | 1.2705E−01 | 1.0006E−01 | 3.8270E−02 |
| A6: | −1.7844E+00 | −2.8782E−01 | −2.2668E+00 | −1.0585E+00 | −9.3173E−02 | −3.9840E−02 |
| A8: | 1.1548E+01 | 1.4292E+00 | 1.2148E+01 | 3.9231E+00 | 1.3504E−01 | 7.7215E−02 |
| A10: | −3.9867E+01 | −3.6965E+00 | −2.4604E+01 | −6.0785E+00 | −1.2870E−01 | −5.5936E−02 |
| A12: | 7.5632E+01 | 4.3074E+00 | 2.5577E+01 | 5.0459E+00 | 6.0469E−02 | 1.4912E−02 |
| A14: | −7.5805E+01 | −2.3236E+00 | −1.2949E+01 | −2.1664E+00 | −1.1509E−02 | −1.3913E−03 |
| A16: | 3.1079E+01 | 5.0901E−01 | 2.4123E+00 | 3.6950E−01 | 0.0000E+00 | 0.0000E+00 |

The units of the radius of curvature, the thickness and the focal length in table 1 are expressed in mm, the surface numbers 0-10 represent the surfaces sequentially arranged from the object-side to the image-side along the optical axis, wherein surface 0 represents a gap between the object and the stop 100 along the optical axis 190, surface 1 represents a gap between the stop 100 and the object-side surface 111 of the first lens 110 along the optical axis 190, the stop 100 is farther away from the object-side than the object-side surface 111 of the first lens 110, so it is expressed as a negative value, surfaces 2, 4, 6, 8 are thicknesses of the first lens 110, the second lens 120, the third lens 130, and the IR band-pass filter 160 along the optical axis 190, respectively, surface 3 represents a gap between the first lens 110 and the second lens 120 along the optical axis 190, surface 5 represents a gap between the second lens 120 and the third lens 130 along the optical axis 190, surface 7 represents a gap between the third lens 130 and the IR band-pass filter 160 along the optical axis 190, surface 9 represents a gap between the IR band-pass filter 160 and the image plane 170 along the optical axis 190.

In table 2, k represents the conic coefficient of the equation of the aspheric surface profiles, and A2, A4, A6, A8, A10, A12, A14, A16: represent the high-order aspheric coefficients. The tables presented below for each embodiment are the corresponding schematic parameter and image plane curves, and the definitions of the tables are the same as Table 1 and Table 2 of the first embodiment. Therefore, an explanation in this regard will not be provided again.

Figure 2A:
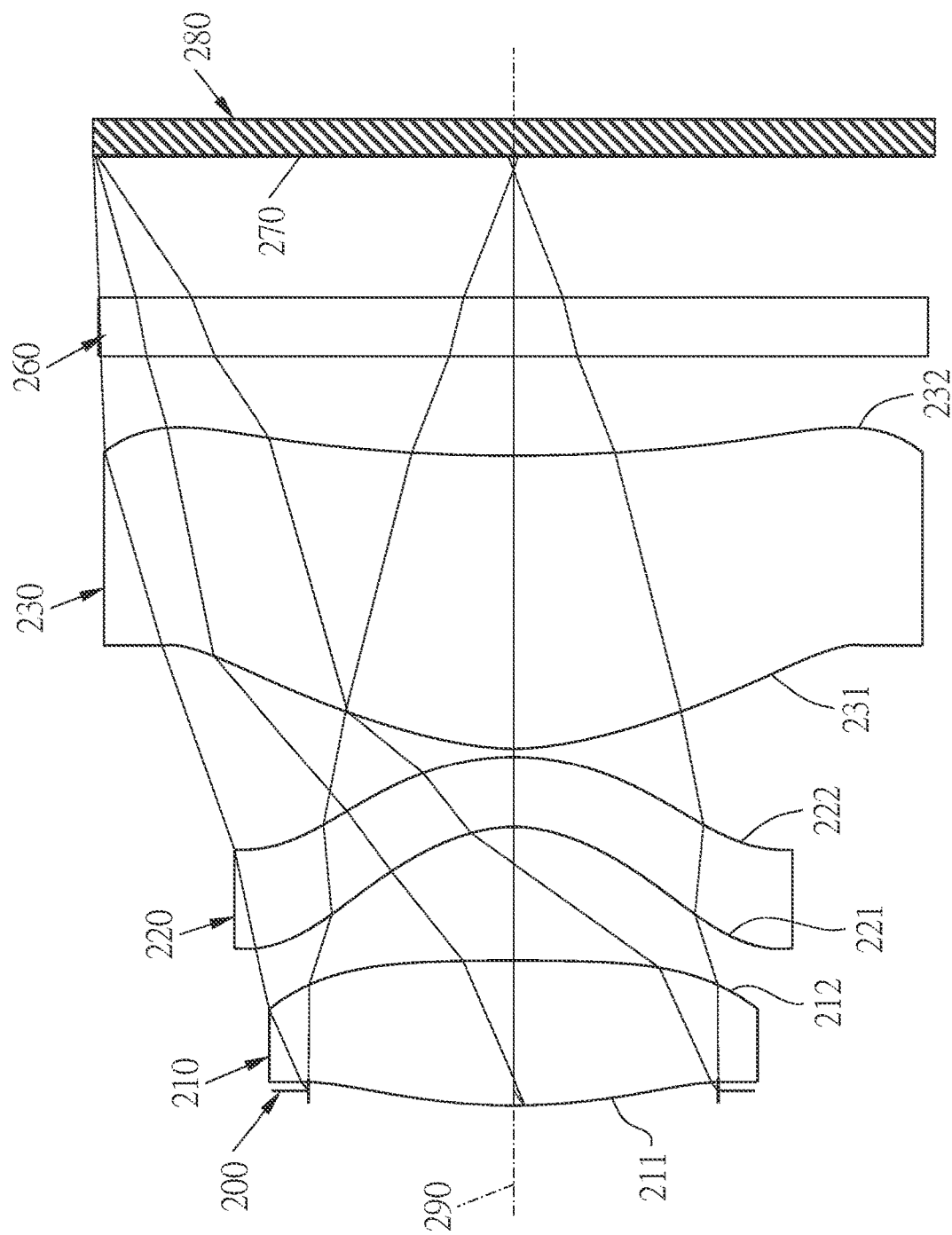
FIG. 2A shows an optical lens assembly in accordance with a second embodiment of the present invention.
Figure 2B:
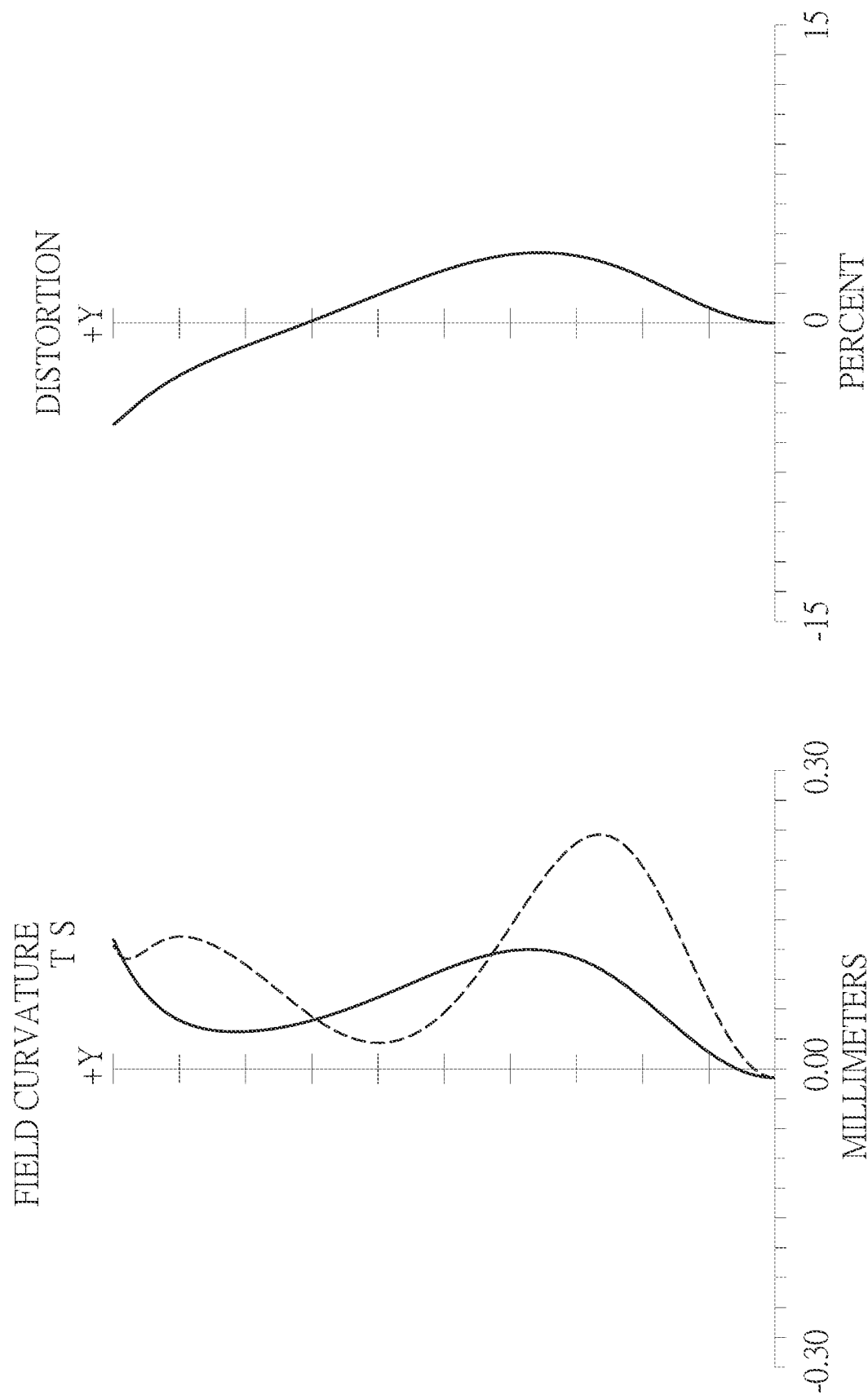
FIG. 2B shows the image plane curve and the distortion curve of the second embodiment of the present invention.

Referring to FIGS. 2A and 2B, FIG. 2A shows an optical lens assembly in accordance with a second embodiment of the present invention, and FIG. 2B shows, in order from left to right, the image plane curve and the distortion curve of the second embodiment of the present invention. An optical lens assembly in accordance with the second embodiment of the present invention comprises, in order from an object side to an image side along an optical axis 290: a stop 200, a first lens 210, a second lens 220, a third lens 230, an IR band-pass filter 260, and an image plane 270. The optical lens assembly is provided with an image sensor 280. Wherein the optical lens assembly has a total of three lenses with refractive power, but not limited to this. The stop 200 is disposed between an object and the first lens 210. The image sensor 280 is disposed on the image plane 270.

The first lens 210 with positive refractive power, comprising an object-side surface 211 and an image-side surface 212, the object-side surface 211 of the first lens 210 being convex near the optical axis 290 and the image-side surface 212 of the first lens 210 being convex near the optical axis 290, the object-side surface 211 and the image-side surface 212 of the first lens 210 are aspheric, and the first lens 210 is made of plastic material.

The second lens 220 with negative refractive power, comprising an object-side surface 221 and an image-side surface 222, the object-side surface 221 of the second lens 220 being concave near the optical axis 290 and the image-side surface 222 of the second lens 220 being convex near the optical axis 290, the object-side surface 221 and the image-side surface 222 of the second lens 220 are aspheric, and the second lens 220 is made of plastic material.

The third lens 230 with positive refractive power, comprising an object-side surface 231 and an image-side surface 232, the object-side surface 231 of the third lens 230 being convex near the optical axis 290 and the image-side surface 232 of the third lens 230 being concave near the optical axis 290, the object-side surface 231 and the image-side surface 232 of the third lens 230 are aspheric, and the third lens 230 is made of plastic material.

The IR band-pass filter 260 made of glass is located between the third lens 230 and the image plane 270 and has no influence on the focal length of the optical lens assembly. The present embodiment selects a filter which is available in the light wavelength range of 940 nm±30 nm, but not limited to this.

The detailed optical data of the second embodiment is shown in table 3, and the aspheric surface data is shown in table 4.

TABLE 3

Embodiment 2
f(focal length) = 1.95 mm, Fno = 1.33, FOV = 77.97 deg

| surface | | Curvature Radius | Thickness/gap | Material | Index (nd) | Abbe # (vd) | Focal length |
|---|---|---|---|---|---|---|---|
| 0 | object | infinity | 1000000 | | | | |
| 1 | stop | infinity | −0.052 | | | | |
| 2 | Lens 1 | 2.325 (ASP) | 0.515 | plastic | 1.643 | 22.5 | 3.23 |
| 3 | | −12.758 (ASP) | 0.475 | | | | |
| 4 | Lens 2 | −0.507 (ASP) | 0.248 | plastic | 1.643 | 22.5 | −2.38 |
| 5 | | −0.920 (ASP) | 0.030 | | | | |
| 6 | Lens 3 | 0.880 (ASP) | 1.040 | plastic | 1.643 | 22.5 | 1.54 |
| 7 | | 6.343 (ASP) | 0.352 | | | | |
| 8 | IR band-pass filter | infinity | 0.210 | glass | 1.517 | 64.2 | |
| 9 | | infinity | 0.5 | | | | |
| 10 | Image plane | infinity | — | | | | |

Note:
reference wavelength is 940 nm

TABLE 4

Aspheric Coefficients

| surface | 2 | 3 | 4 | 5 | 6 | 7 |
|---|---|---|---|---|---|---|
| K: | 3.4726E+00 | 1.2164E+02 | −3.3201E+00 | −9.0765E−01 | −1.2698E+01 | −1.2283E+01 |
| A2: | 0.0000E+00 | 0.0000E+00 | 0.0000E+00 | 0.0000E+00 | 0.0000E+00 | 0.0000E+00 |
| A4: | 6.5974E−02 | −1.1416E−01 | −3.0368E−01 | −1.6734E−02 | 1.8905E−01 | 2.4791E−02 |
| A6: | −1.2039E+00 | −6.9870E−01 | −2.2531E+00 | −5.8969E−01 | −2.6567E−01 | −7.2732E−02 |
| A8: | 3.7682E+00 | 2.8465E+00 | 1.1654E+01 | 3.3034E+00 | 3.0451E−01 | 1.3372E−01 |
| A10: | −6.9165E+00 | −6.3270E+00 | −2.1527E+01 | −5.0003E+00 | −2.4775E−01 | −1.0958E−01 |
| A12: | 5.7603E+00 | 6.2326E+00 | 1.9665E+01 | 3.5422E+00 | 1.1360E−01 | 3.6031E−02 |
| A14: | −2.0554E+00 | −1.4575E+00 | −7.9261E+00 | −9.9051E−01 | −2.3764E−02 | −4.2821E−03 |
| A16: | 3.7316E−01 | −8.4365E−01 | 6.9009E−01 | −1.9449E−02 | 0.0000E+00 | 0.0000E+00 |

In the second embodiment, the equation of the aspheric surface profiles of the aforementioned lenses is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

| Embodiment 2 | | | |
|---|---|---|---|
| f[mm] | 1.95 | CT3/CT2 | 4.19 |
| Fno | 1.33 | FOV/f[deg./mm] | 40.02 |
| FOV[deg.] | 77.97 | FOV/TL[deg./mm] | 23.14 |
| EPD[mm] | 1.47 | HFOV/R3[deg./mm] | −76.84 |
| HFOV/(R6/f)[deg.] | 11.97 | HFOV/Rl[deg./mm] | 33.53 |
| R1/R3 | −4.58 | f2*TL/cos(HFOV) [mm$^2$] | −10.30 |
| R2/R3 | 25.15 | f*TL/CT3[mm] | 6.31 |
| R2/R5 | −14.50 | R1/R5 | 2.64 |
| R2/R6 | −2.01 | f3/EPD | 1.05 |
| R2/EPD | −8.68 | f1/f3 | 2.09 |
| R6/f3 | 4.11 | T12/CT2 | 1.91 |
| 2/CT2 | −9.57 | CT1/CT2 | 2.07 |
| B/CT3 | 1.48 | T23/CT3 | 0.03 |
| CT3/R5 | 1.18 | f1/f2 | −1.36 |
| TD/T23 | 77.87 | | |

Figure 3A:
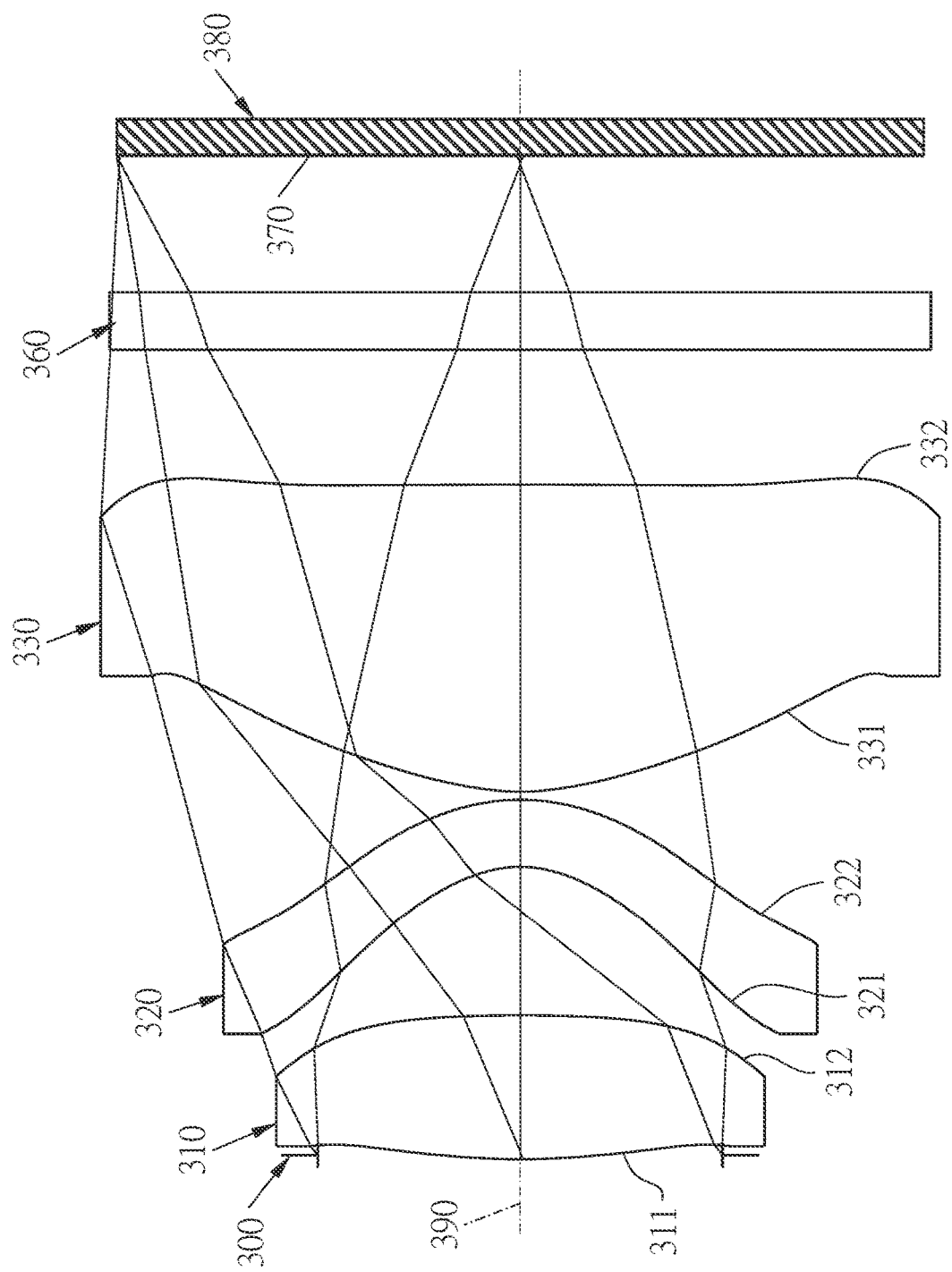
FIG. 3A shows an optical lens assembly in accordance with a third embodiment of the present invention.
Figure 3B:
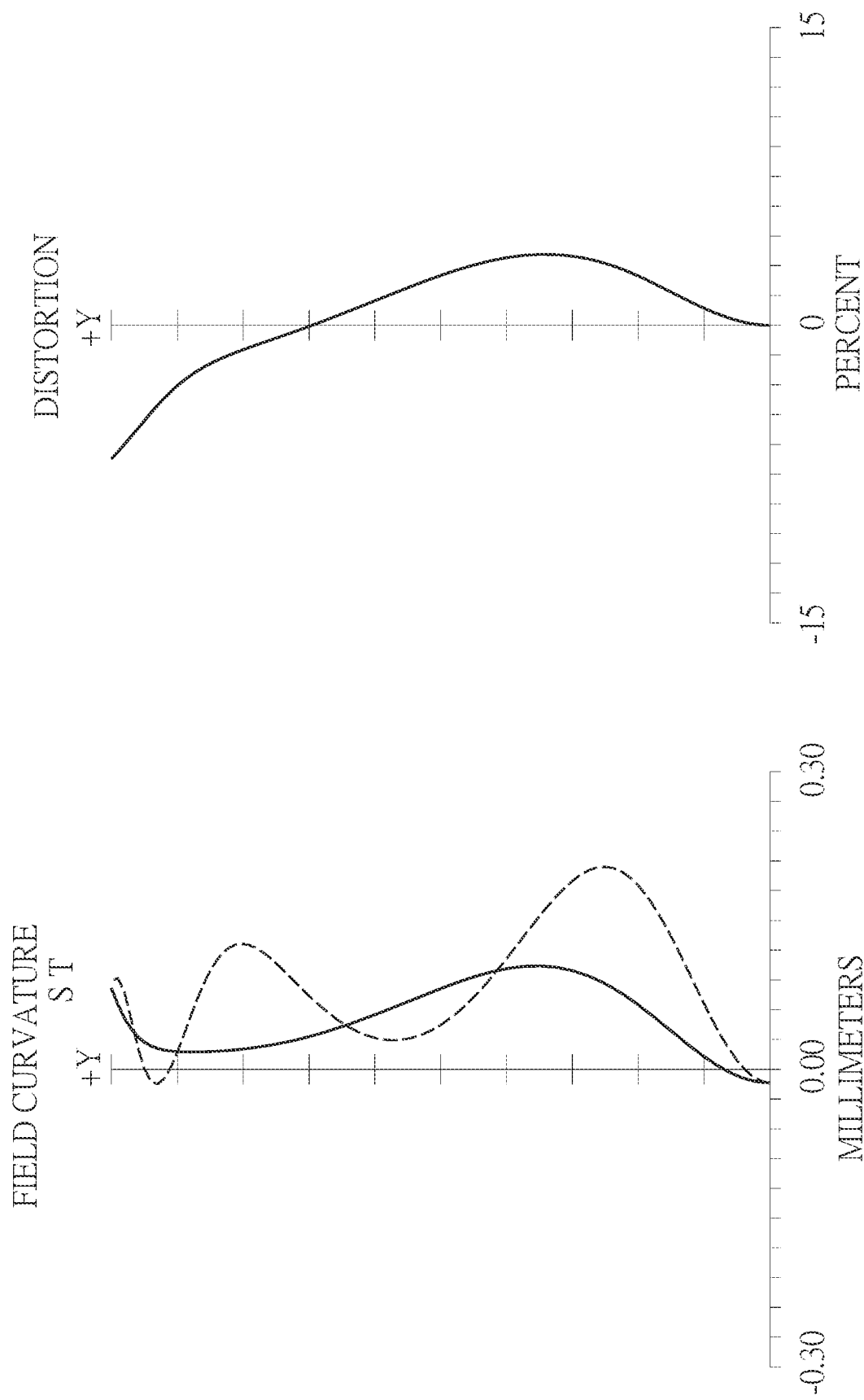
FIG. 3B shows the image plane curve and the distortion curve of the third embodiment of the present invention.

Referring to FIGS. 3A and 3B, FIG. 3A shows an optical lens assembly in accordance with a third embodiment of the present invention, and FIG. 3B shows, in order from left to right, the image plane curve and the distortion curve of the third embodiment of the present invention. An optical lens assembly in accordance with the third embodiment of the present invention comprises, in order from an object side to an image side along an optical axis 390: a stop 300, a first lens 310, a second lens 320, a third lens 330, an IR band-pass filter 360, and an image plane 370. The optical lens assembly is provided with an image sensor 380. Wherein the optical lens assembly has a total of three lenses with refractive power, but not limited to this. The stop 300 is disposed between an object and the first lens 310. The image sensor 380 is disposed on the image plane 370.

The first lens 310 with positive refractive power, comprising an object-side surface 311 and an image-side surface 312, the object-side surface 311 of the first lens 310 being convex near the optical axis 390 and the image-side surface 312 of the first lens 310 being convex near the optical axis 390, the object-side surface 311 and the image-side surface 312 of the first lens 310 are aspheric, and the first lens 310 is made of plastic material.

The second lens 320 with negative refractive power, comprising an object-side surface 321 and an image-side surface 322, the object-side surface 321 of the second lens 320 being concave near the optical axis 390 and the image-side surface 322 of the second lens 320 being convex near the optical axis 390, the object-side surface 321 and the image-side surface 322 of the second lens 320 are aspheric, and the second lens 320 is made of plastic material.

The third lens 330 with positive refractive power, comprising an object-side surface 331 and an image-side surface 332, the object-side surface 331 of the third lens 330 being convex near the optical axis 390 and the image-side surface 332 of the third lens 330 being convex near the optical axis 390, the object-side surface 331 and the image-side surface 332 of the third lens 330 are aspheric, and the third lens 330 is made of plastic material.

The IR band-pass filter 360 made of glass is located between the third lens 330 and the image plane 370 and has no influence on the focal length of the optical lens assembly. The present embodiment selects a filter which is available in the light wavelength range of 940 nm±30 nm, but not limited to this.

The detailed optical data of the third embodiment is shown in table 5, and the aspheric surface data is shown in table 6.

TABLE 5

Embodiment 3
f (focal length) = 1.99 mm, Fno = 1.32, FOV = 77.83 deg.

| surface | | Curvature Radius | | Thickness/gap | Material | Index (nd) | Abbe # (vd) | Focal length |
|---|---|---|---|---|---|---|---|---|
| 0 | object | infinity | | 1000000 | | | | |
| 1 | stop | infinity | | −0.014 | | | | |
| 2 | Lens 1 | 3.047 | (ASP) | 0.527 | plastic | 1.643 | 22.5 | 3.55 |
| 3 | | −7.334 | (ASP) | 0.548 | | | | |
| 4 | Lens 2 | −0.438 | (ASP) | 0.246 | plastic | 1.643 | 22.5 | −2.05 |
| 5 | | −0.812 | (ASP) | 0.029 | | | | |
| 6 | Lens 3 | 0.901 | (ASP) | 1.130 | plastic | 1.643 | 22.5 | 1.43 |
| 7 | | −28.781 | (ASP) | 0.497 | | | | |
| 8 | IR band-pass filter | infinity | | 0.210 | glass | 1.517 | 64.2 | |
| 9 | | infinity | | 0.5 | | | | |
| 10 | Image plane | infinity | | — | | | | |

Note:
reference wavelength is 940 nm

TABLE 6

Aspheric Coefficients

| surface | 2 | 3 | 4 | 5 | 6 | 7 |
|---|---|---|---|---|---|---|
| K: | 2.0629E+00 | 4.9507E+01 | −2.8400E+00 | −8.8215E−01 | −1.1922E+01 | −1.3702E+02 |
| A2: | 0.0000E+00 | 0.0000E+00 | 0.0000E+00 | 0.0000E+00 | 0.0000E+00 | 0.0000E+00 |
| A4: | 5.3498E−02 | −8.6825E−02 | −3.8343E−01 | 1.2358E−01 | 1.0851E−01 | 4.0849E−02 |
| A6: | −1.6725E+00 | −1.1667E+00 | −2.6906E+00 | −1.1208E+00 | −4.6723E−02 | −9.1246E−02 |
| A8: | 9.0676E+00 | 5.6829E+00 | 1.3585E+01 | 4.2920E+00 | 4.2219E−03 | 1.5399E−01 |
| A10: | −2.8169E+01 | −1.4327E+01 | −2.6834E+01 | −6.7672E+00 | 1.3057E−03 | −1.0311E−01 |
| A12: | 4.9665E+01 | 1.8755E+01 | 2.7320E+01 | 5.7044E+00 | 4.4494E−03 | 2.7149E−02 |
| A14: | −4.8611E+01 | −1.2463E+01 | −1.3392E+01 | −2.4919E+00 | −3.2417E−03 | −2.4685E−03 |
| A16: | 2.0500E+01 | 3.4358E+00 | 2.2863E+00 | 4.3040E−01 | 0.0000E+00 | 0.0000E+00 |

In the third embodiment, the equation of the aspheric surface profiles of the aforementioned lenses is the same as the equation of the first embodiment. Also, the definitions of these parameters shown in the following table are the same as those stated in the first embodiment with corresponding values for the third embodiment, so an explanation in this regard will not be provided again.

Moreover, these parameters can be calculated from Table 5 and Table 6 as the following values and satisfy the following conditions:

| Embodiment 3 | | | |
|---|---|---|---|
| f[mm] | 1.99 | CT3/CT2 | 4.60 |
| Fno | 1.32 | FOV/f[deg./mm] | 39.18 |
| FOV[deg.] | 77.83 | FOV/TL[deg./mm] | 21.11 |
| EPD[mm] | 1.50 | HFOV/R3[deg./mm] | −88.95 |
| HFOV/(R6/f)[deg.] | −2.69 | HFOV/R1[deg./mm] | 25.54 |
| R1/R3 | −6.97 | f2*TL/cos(HFOV) [mm$^2$] | −9.71 |
| R2/R3 | 16.77 | f*TL/CT3[mm] | 6.48 |
| R2/R5 | −8.14 | R1/R5 | 3.38 |
| R2/R6 | 0.25 | f3/EPD | 0.95 |
| R2/EPD | −4.88 | f1/f3 | 2.48 |
| R6/f3 | −20.06 | T12/CT2 | 2.23 |
| f2/CT2 | −8.33 | CT1/CT2 | 2.14 |
| B/CT3 | 1.27 | T23/CT3 | 0.03 |
| CT3/R5 | 1.26 | f1/f2 | −1.73 |
| TD/T23 | 86.58 | | |

Figure 4A:
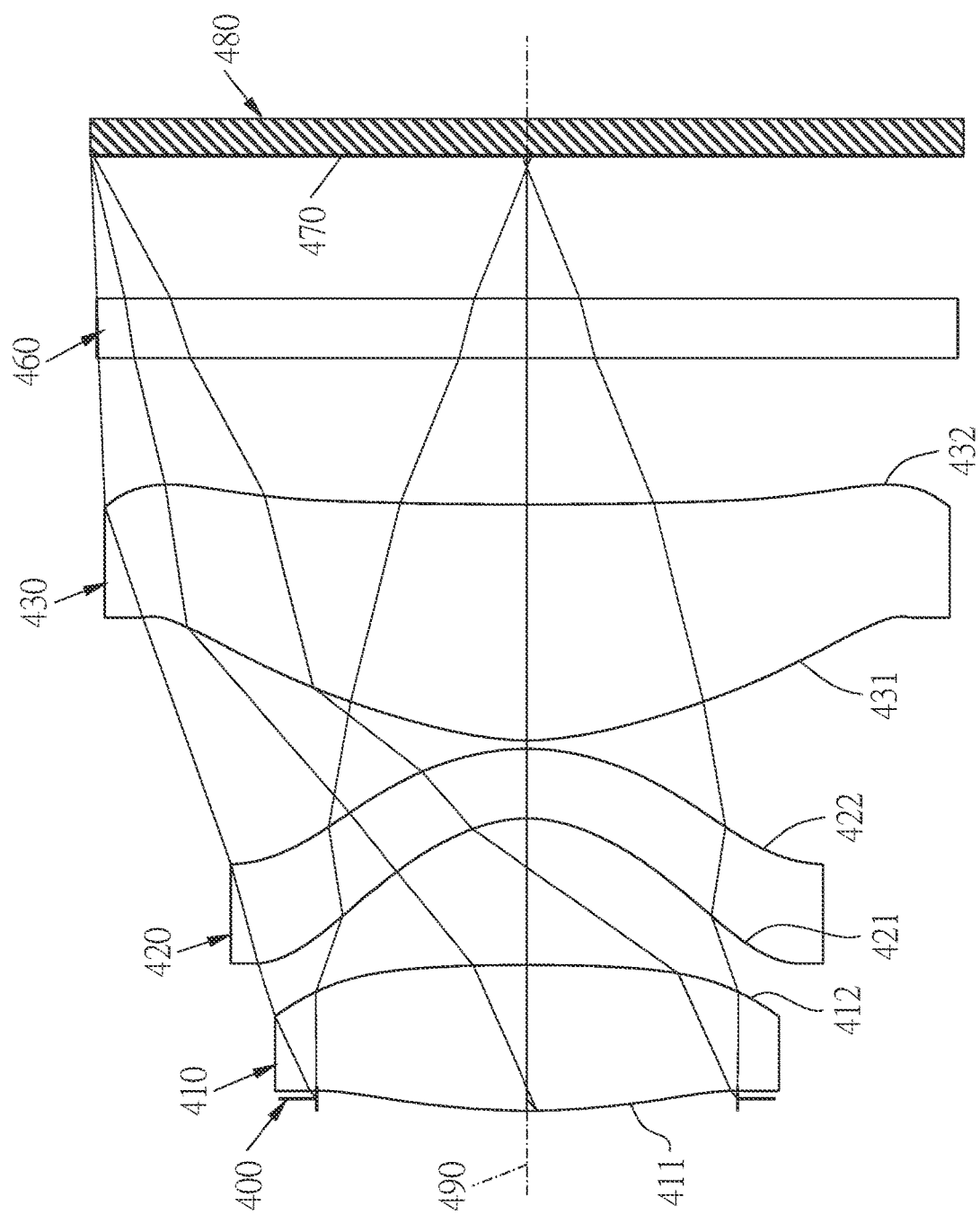
FIG. 4A shows an optical lens assembly in accordance with a fourth embodiment of the present invention.

Referring to FIGS. 4A and 4B, FIG. 4A shows an optical lens assembly in accordance with a fourth embodiment of the present invention, and FIG. 4B shows, in order from left to right, the image plane curve and the distortion curve of the fourth embodiment of the present invention. An optical lens assembly in accordance with the fourth embodiment of the present invention comprises, in order from an object side to an image side along an optical axis 490: a stop 400, a first lens 410, a second lens 420, a third lens 430, an IR band-pass filter 460, and an image plane 470. The optical lens assembly is provided with an image sensor 480. Wherein the optical lens assembly has a total of three lenses with refractive power, but not limited to this. The stop 400 is disposed between an object and the first lens 410. The image sensor 480 is disposed on the image plane 470.

The first lens 410 with positive refractive power, comprising an object-side surface 411 and an image-side surface 412, the object-side surface 411 of the first lens 410 being convex near the optical axis 490 and the image-side surface 412 of the first lens 410 being convex near the optical axis 490, the object-side surface 411 and the image-side surface 412 of the first lens 410 are aspheric, and the first lens 410 is made of plastic material.

The second lens 420 with negative refractive power, comprising an object-side surface 421 and an image-side surface 422, the object-side surface 421 of the second lens 420 being concave near the optical axis 490 and the image-side surface 422 of the second lens 420 being convex near the optical axis 490, the object-side surface 421 and the image-side surface 422 of the second lens 420 are aspheric, and the second lens 420 is made of plastic material.

The third lens 430 with positive refractive power, comprising an object-side surface 431 and an image-side surface 432, the object-side surface 431 of the third lens 430 being convex near the optical axis 490 and the image-side surface 432 of the third lens 430 being concave near the optical axis 490, the object-side surface 431 and the image-side surface 432 of the third lens 430 are aspheric, and the third lens 430 is made of plastic material.

The IR band-pass filter 460 made of glass is located between the third lens 430 and the image plane 470 and has no influence on the focal length of the optical lens assembly. The present embodiment selects a filter which is available in the light wavelength range of 940 nm±30 nm, but not limited to this.

The detailed optical data of the fourth embodiment is shown in table 7, and the aspheric surface data is shown in table 8.

TABLE 7

Embodiment 4
f (focal length) = 1.92 mm, Fno = 1.33, FOV = 77.93 deg.

| surface | | Curvature Radius | Thickness/ gap | Material | Index (nd) | Abbe # (vd) | Focal length |
|---|---|---|---|---|---|---|---|
| 0 | object | infinity | 1000000 | | | | |
| 1 | stop | infinity | −0.043 | | | | |
| 2 | Lens 1 | 2.464 (ASP) | 0.514 | plastic | 1.643 | 22.5 | 3.11 |
| 3 | | −8.009 (ASP) | 0.518 | | | | |
| 4 | Lens 2 | −0.443 (ASP) | 0.245 | plastic | 1.643 | 22.5 | −2.11 |
| 5 | | −0.812 (ASP) | 0.030 | | | | |
| 6 | Lens 3 | 0.875 (ASP) | 0.833 | plastic | 1.643 | 22.5 | 1.46 |
| 7 | | 19.359 (ASP) | 0.518 | | | | |
| 8 | IR band-pass filter | infinity | 0.210 | glass | 1.517 | 64.2 | |
| 9 | | infinity | 0.5 | | | | |
| 10 | Image plane | infinity | — | | | | |

Note:
reference wavelength is 940 nm

TABLE 8

Aspheric Coefficients

| surface | 2 | 3 | 4 | 5 | 6 | 7 |
|---|---|---|---|---|---|---|
| K: | −6.9331E−02 | 7.3750E+01 | −2.9778E+00 | −8.2349E−01 | −1.1175E+01 | 1.5842E+02 |
| A2: | 0.0000E+00 | 0.0000E+00 | 0.0000E+00 | 0.0000E+00 | 0.0000E+00 | 0.0000E+00 |
| A4: | 1.5616E−02 | −5.5272E−02 | −4.6647E−01 | 1.1197E−01 | 1.4182E−01 | 9.2461E−03 |
| A6: | −8.5607E−01 | −9.0432E−01 | −2.1458E+00 | −9.5565E−01 | −1.7983E−01 | −6.2859E−02 |
| A8: | 3.4082E+00 | 3.3172E+00 | 1.1662E+01 | 3.6411E+00 | 2.5095E−01 | 1.5032E−01 |
| A10: | −7.1963E+00 | −6.7318E+00 | −2.1623E+01 | −4.9305E+00 | −2.2667E−01 | −1.0835E−01 |
| A12: | 6.0313E+00 | 5.9846E+00 | 1.9745E+01 | 3.3856E+00 | 1.1016E−01 | 2.7700E−02 |
| A14: | −1.3027E+00 | −1.3345E+00 | −7.6161E+00 | −1.0348E+00 | −2.3313E−02 | −2.3419E−03 |
| A16: | −2.5799E−01 | −3.9567E−01 | 4.0899E−01 | 4.0925E−02 | 0.0000E+00 | 0.0000E+00 |

In the fourth embodiment, the equation of the aspheric surface profiles of the aforementioned lenses is the same as the equation of the first embodiment. Also, the definitions of these parameters shown in the following table are the same as those stated in the first embodiment with corresponding values for the fourth embodiment, so an explanation in this regard will not be provided again.

Moreover, these parameters can be calculated from Table 7 and Table 8 as the following values and satisfy the following conditions:

| Embodiment 4 | | | |
|---|---|---|---|
| f[mm] | 1.92 | CT3/CT2 | 3.41 |
| Fno | 1.33 | FOV/f[deg./mm] | 40.55 |
| FOV[deg.] | 77.93 | FOV/TL[deg./mm] | 23.15 |
| EPD[mm] | 1.45 | HFOV/R3[deg./mm] | −88.01 |
| HFOV/(R6/f)[deg.] | 3.87 | HFOV/R1[deg./mm] | 31.63 |
| R1/R3 | −5.56 | f2*TL/cos(HFOV) [mm$^2$] | −9.13 |
| R2/R3 | 18.09 | f*TL/CT3[mm] | 7.77 |
| R2/R5 | −9.15 | R1/R5 | 2.82 |
| R2/R6 | −0.41 | f3/EPD | 1.01 |
| R2/EPD | −5.54 | f1/f3 | 2.13 |
| R6/f3 | 13.28 | T12/CT2 | 2.12 |
| f2/CT2 | −8.63 | CT1/CT2 | 2.10 |
| f3/CT3 | 1.75 | T23/CT3 | 0.04 |
| CT3/R5 | 0.95 | f1/f2 | −1.47 |
| TD/T23 | 72.00 | | |

Figure 5A:
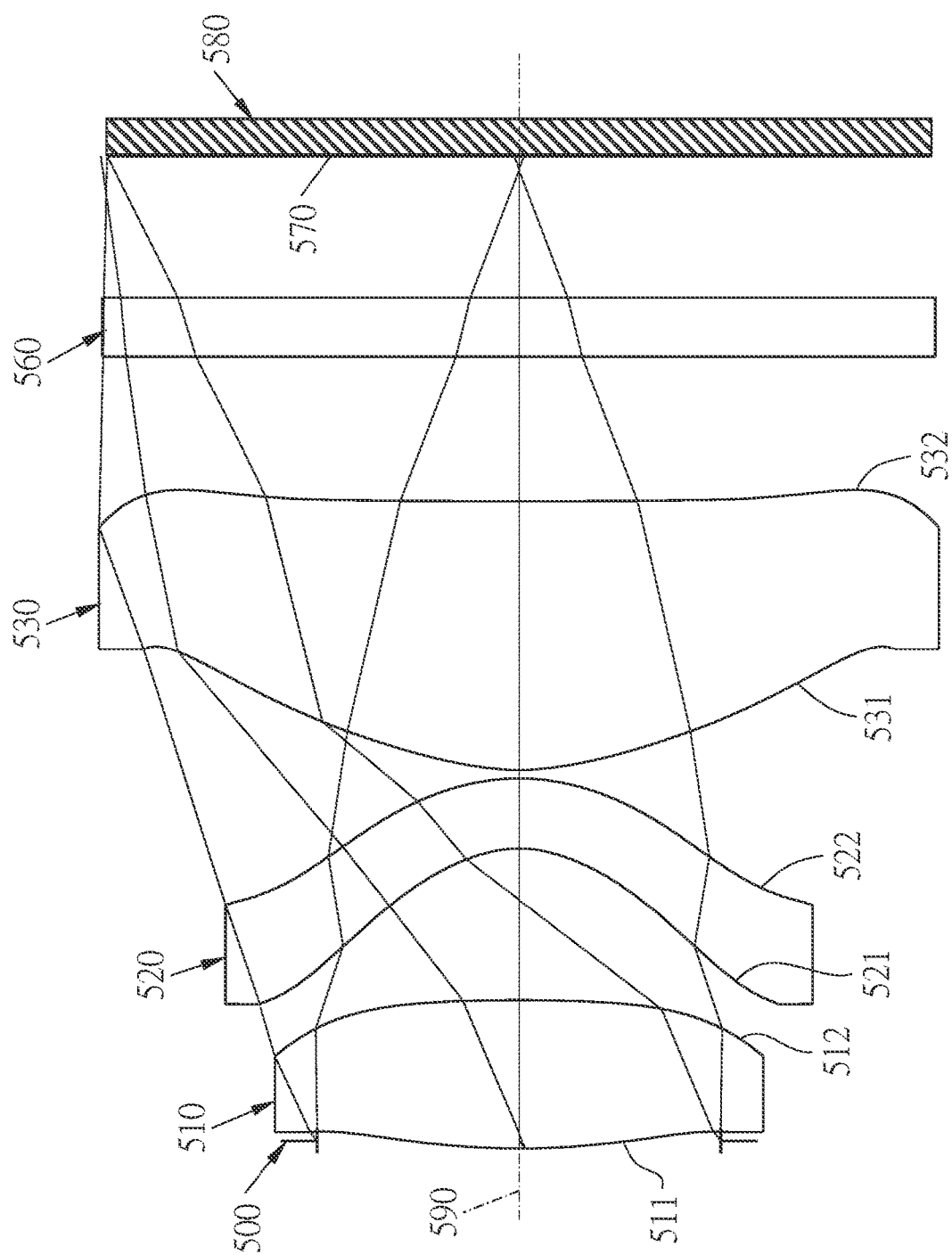
FIG. 5A shows an optical lens assembly in accordance with a fifth embodiment of the present invention.
Figure 5B:
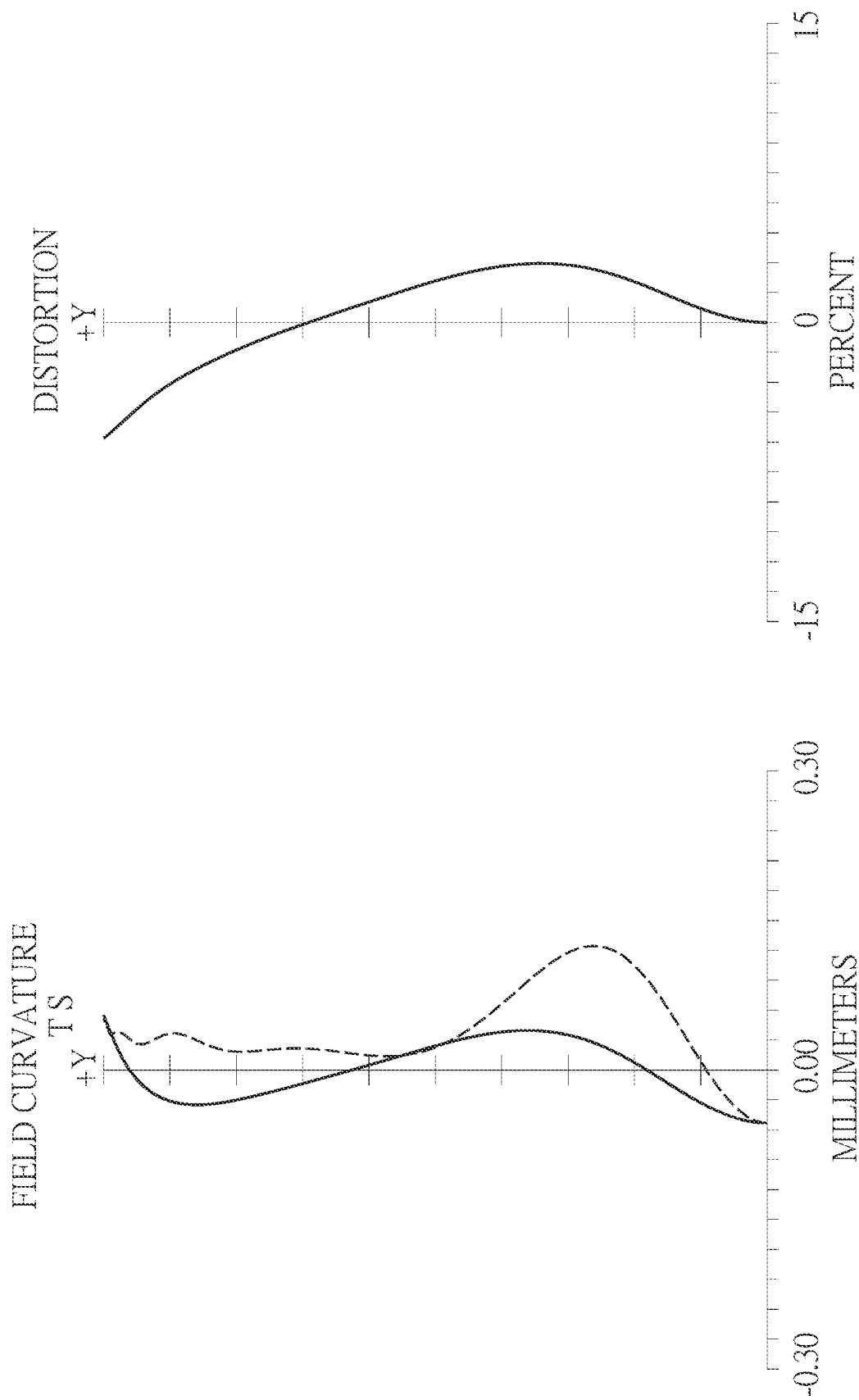
FIG. 5B shows the image plane curve and the distortion curve of the fifth embodiment of the present invention.

Referring to FIGS. 5A and 5B, FIG. 5A shows an optical lens assembly in accordance with a fifth embodiment of the present invention, and FIG. 5B shows, in order from left to right, the image plane curve and the distortion curve of the fifth embodiment of the present invention. An optical lens assembly in accordance with the fifth embodiment of the present invention comprises, in order from an object side to an image side along an optical axis 590: a stop 500, a first lens 510, a second lens 520, a third lens 530, an IR band-pass filter 560, and an image plane 570. The optical lens assembly is provided with an image sensor 580. Wherein the optical lens assembly has a total of three lenses with refractive power, but not limited to this. The stop 500 is disposed between an object and the first lens 510. The image sensor 580 is disposed on the image plane 570.

The first lens 510 with positive refractive power, comprising an object-side surface 511 and an image-side surface 512, the object-side surface 511 of the first lens 510 being convex near the optical axis 590 and the image-side surface 512 of the first lens 510 being convex near the optical axis 590, the object-side surface 511 and the image-side surface 512 of the first lens 510 are aspheric, and the first lens 510 is made of plastic material.

The second lens 520 with negative refractive power, comprising an object-side surface 521 and an image-side surface 522, the object-side surface 521 of the second lens 520 being concave near the optical axis 590 and the image-side surface 522 of the second lens 520 being convex near the optical axis 590, the object-side surface 521 and the image-side surface 522 of the second lens 520 are aspheric, and the second lens 520 is made of plastic material.

The third lens 530 with positive refractive power, comprising an object-side surface 531 and an image-side surface 532, the object-side surface 531 of the third lens 530 being convex near the optical axis 590 and the image-side surface 532 of the third lens 530 being concave near the optical axis 590, the object-side surface 531 and the image-side surface 532 of the third lens 530 are aspheric, and the third lens 530 is made of plastic material.

The IR band-pass filter 560 made of glass is located between the third lens 530 and the image plane 570 and has no influence on the focal length of the optical lens assembly. The present embodiment selects a filter which is available in the light wavelength range of 940 nm±30 nm, but not limited to this.

The detailed optical data of the fifth embodiment is shown in table 9, and the aspheric surface data is shown in table 10.

TABLE 9

Embodiment 5
f (focal length) = 1.93 mm, Fno = 1.34, FOV = 78.30 deg.

| surface | | Curvature Radius | | Thickness/ gap | Material | Index (nd) | Abbe # (vd) | Focal length |
|---|---|---|---|---|---|---|---|---|
| 0 | object | infinity | | 1000000 | | | | |
| 1 | stop | infinity | | −0.028 | | | | |
| 2 | Lens 1 | 2.663 | (ASP) | 0.526 | plastic | 1.643 | 22.5 | 3.24 |
| 3 | | −7.404 | (ASP) | 0.540 | | | | |
| 4 | Lens 2 | −0.442 | (ASP) | 0.248 | plastic | 1.643 | 22.5 | −2.17 |
| 5 | | −0.801 | (ASP) | 0.029 | | | | |
| 6 | Lens 3 | 0.908 | (ASP) | 0.954 | plastic | 1.643 | 22.5 | 1.47 |
| 7 | | 241.613 | (ASP) | 0.514 | | | | |
| 8 | IR band-pass filter | infinity | | 0.210 | glass | 1.517 | 64.2 | |
| 9 | | infinity | | 0.5 | | | | |
| 10 | Image plane | infinity | | — | | | | |

Note:
reference wavelength is 940 nm

TABLE 10

Aspheric Coefficients

| surface | 2 | 3 | 4 | 5 | 6 | 7 |
|---|---|---|---|---|---|---|
| K: | −1.0949E+00 | 6.0856E+01 | −2.7631E+00 | −8.8597E−01 | −1.1391E+01 | 1.5001E+02 |
| A2: | 0.0000E+00 | 0.0000E+00 | 0.0000E+00 | 0.0000E+00 | 0.0000E+00 | 0.0000E+00 |

TABLE 10-continued

Aspheric Coefficients

| surface | 2 | 3 | 4 | 5 | 6 | 7 |
|---|---|---|---|---|---|---|
| A4: | 6.7309E−03 | −7.7521E−02 | −4.3312E−01 | 1.1967E−01 | 1.4214E−01 | 2.8097E−02 |
| A6: | −8.6528E−01 | −8.6758E−01 | −2.1670E+00 | −9.6679E−01 | −1.8151E−01 | −7.6369E−02 |
| A8: | 3.4874E+00 | 3.3045E+00 | 1.1600E+01 | 3.6131E+00 | 2.5450E−01 | 1.4963E−01 |
| A10: | −7.1642E+00 | −6.7297E+00 | −2.1643E+01 | −4.9584E+00 | −2.2866E−01 | −1.0570E−01 |
| A12: | 5.7778E+00 | 6.0408E+00 | 1.9765E+01 | 3.3864E+00 | 1.0794E−01 | 2.8062E−02 |
| A14: | −1.7681E+00 | −1.4167E+00 | −7.5938E+00 | −1.0274E+00 | −2.1734E−02 | −2.5487E−03 |
| A16: | 8.2550E−01 | −4.2584E−01 | 3.9759E−01 | 5.4248E−02 | 0.0000E+00 | 0.0000E+00 |

In the fifth embodiment, the equation of the aspheric surface profiles of the aforementioned lenses is the same as the equation of the first embodiment. Also, the definitions of these parameters shown in the following table are the same as those stated in the first embodiment with corresponding values for the fifth embodiment, so an explanation in this regard will not be provided again.

Moreover, these parameters can be calculated from Table 9 and Table 10 as the following values and satisfy the following conditions:

Embodiment 5

| | | | |
|---|---|---|---|
| f[mm] | 1.93 | CT3/CT2 | 3.84 |
| Fno | 1.34 | FOV/f[deg./mm] | 40.51 |
| FOV[deg.] | 78.30 | FOV/TL[deg./mm] | 22.24 |
| EPD[mm] | 1.45 | HFOV/R3[deg./mm] | −88.60 |
| HFOV/(R6/f)[deg.] | 0.31 | HFOV/R1[deg./mm] | 29.40 |
| R1/R3 | −6.03 | f2*TL/cos(HFOV) [mm²] | −9.85 |
| R2/R3 | 16.76 | f*TL/CT3[mm] | 7.13 |
| R2/R5 | −8.16 | R1/R5 | 2.93 |
| R2/R6 | −0.03 | f3/EPD | 1.02 |
| R2/EPD | −5.12 | f1/f3 | 2.20 |
| R6/f3 | 164.05 | T12/CT2 | 2.18 |
| f2/CT2 | −8.74 | CT1/CT2 | 2.12 |
| f3/CT3 | 1.54 | T23/CT3 | 0.03 |
| CT3/R5 | 1.05 | f1/f2 | −1.49 |
| TD/T23 | 78.04 | | |

Figure 6A:
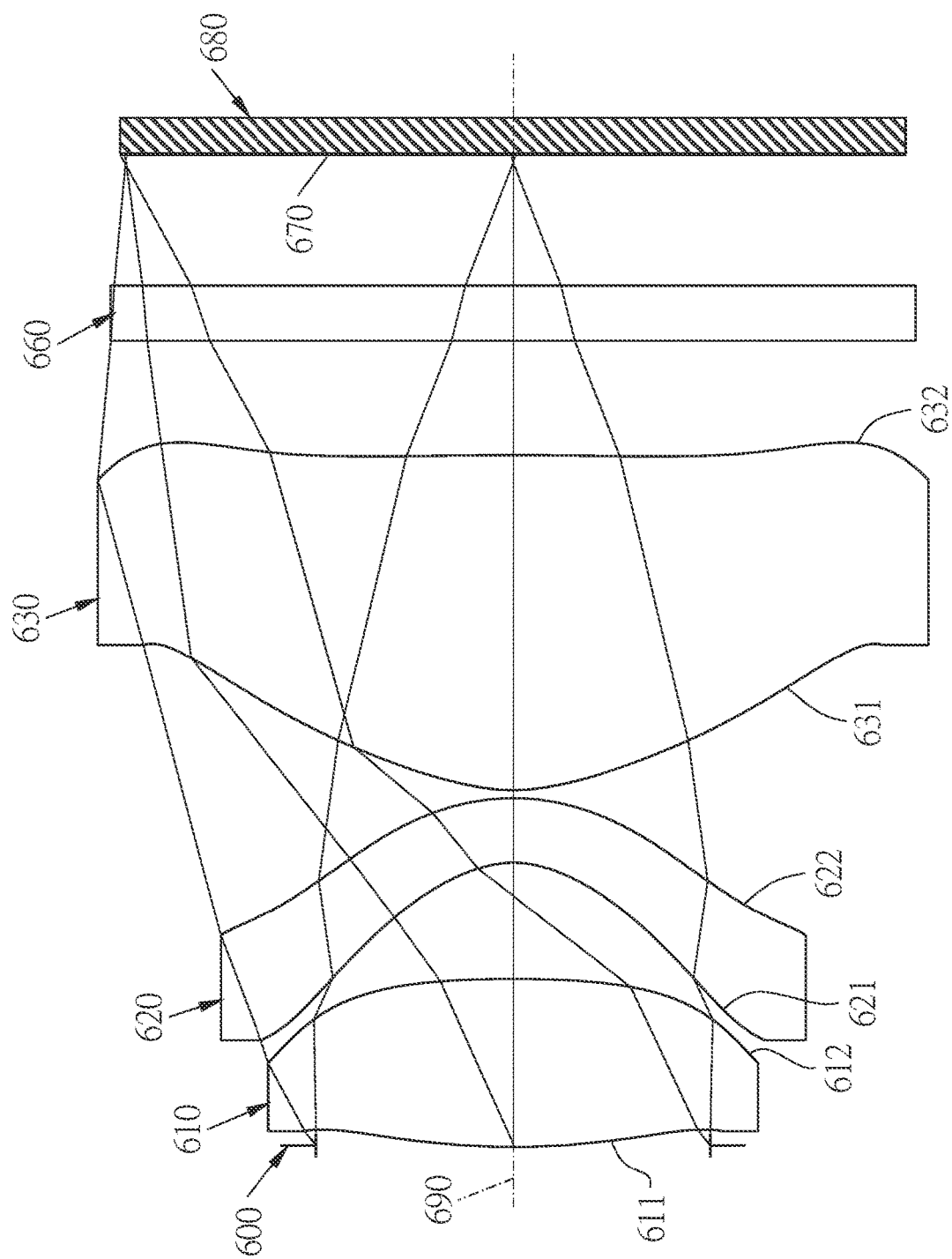
FIG. 6A shows an optical lens assembly in accordance with a sixth embodiment of the present invention.
Figure 6B:
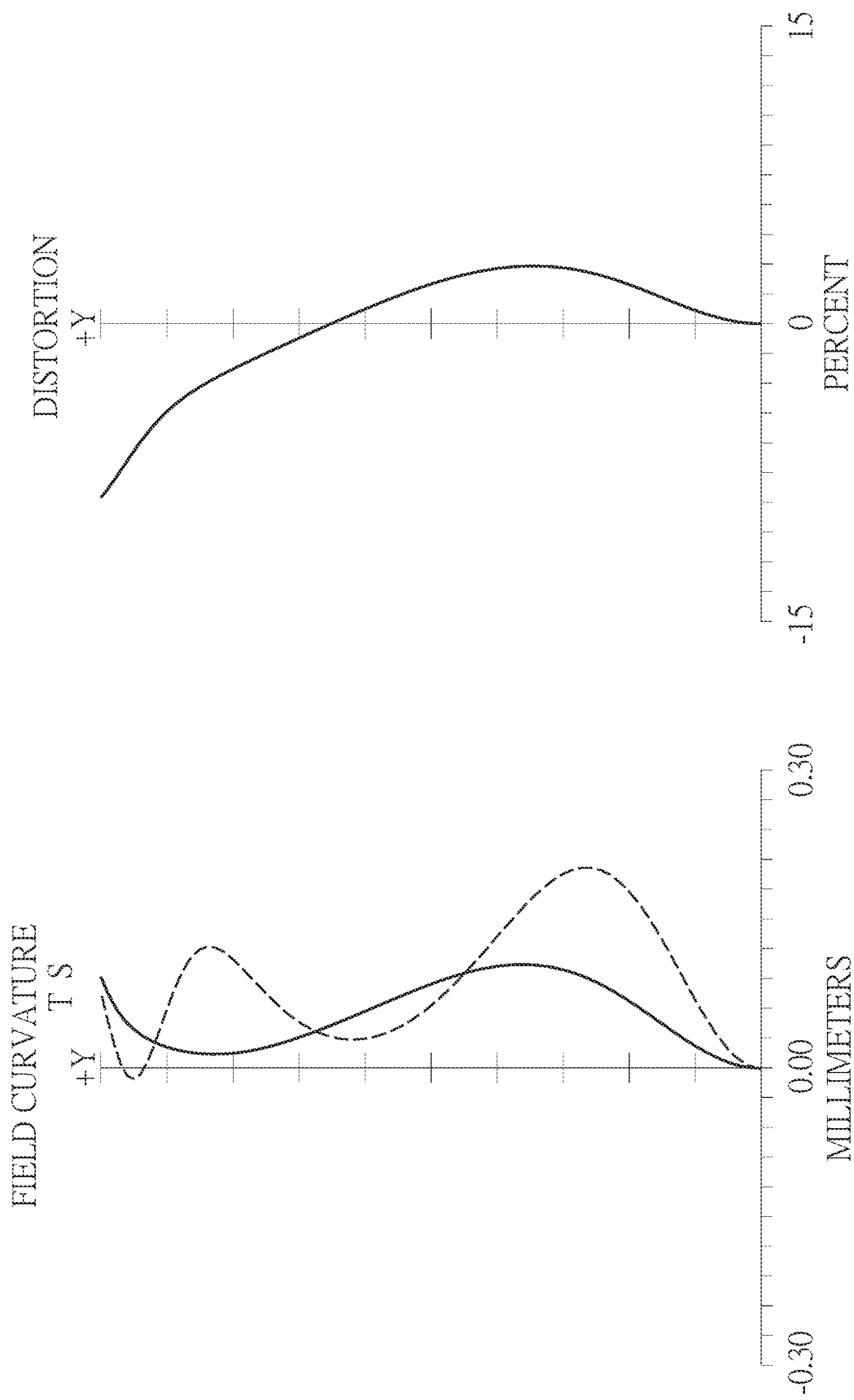
FIG. 6B shows the image plane curve and the distortion curve of the sixth embodiment of the present invention.

Referring to FIGS. 6A and 6B, FIG. 6A shows an optical lens assembly in accordance with a sixth embodiment of the present invention, and FIG. 6B shows, in order from left to right, the image plane curve and the distortion curve of the sixth embodiment of the present invention. An optical lens assembly in accordance with the sixth embodiment of the present invention comprises, in order from an object side to an image side along an optical axis 690: a stop 600, a first lens 610, a second lens 620, a third lens 630, an IR band-pass filter 660, and an image plane 670. The optical lens assembly is provided with an image sensor 680. Wherein the optical lens assembly has a total of three lenses with refractive power, but not limited to this. The stop 600 is disposed between an object and the first lens 610. The image sensor 680 is disposed on the image plane 670.

The first lens 610 with positive refractive power, comprising an object-side surface 611 and an image-side surface 612, the object-side surface 611 of the first lens 610 being convex near the optical axis 690 and the image-side surface 612 of the first lens 610 being convex near the optical axis 690, the object-side surface 611 and the image-side surface 612 of the first lens 610 are aspheric, and the first lens 610 is made of plastic material.

The second lens 620 with negative refractive power, comprising an object-side surface 621 and an image-side surface 622, the object-side surface 621 of the second lens 620 being concave near the optical axis 690 and the image-side surface 622 of the second lens 620 being convex near the optical axis 690, the object-side surface 621 and the image-side surface 622 of the second lens 620 are aspheric, and the second lens 620 is made of plastic material.

The third lens 630 with positive refractive power, comprising an object-side surface 631 and an image-side surface 632, the object-side surface 631 of the third lens 630 being convex near the optical axis 690 and the image-side surface 632 of the third lens 630 being convex near the optical axis 690, the object-side surface 631 and the image-side surface 632 of the third lens 630 are aspheric, and the third lens 630 is made of plastic material.

The IR band-pass filter 660 made of glass is located between the third lens 630 and the image plane 670 and has no influence on the focal length of the optical lens assembly. The present embodiment selects a filter which is available in the light wavelength range of 940 nm±30 nm, but not limited to this.

The detailed optical data of the sixth embodiment is shown in table 11, and the aspheric surface data is shown in table 12.

TABLE 11

Embodiment 6
f (focal length) = 2.03 mm, Fno = 1.33, FOV = 78.00 deg.

| surface | | Curvature Radius | Thickness/ gap | Material | Index (nd) | Abbe # (vd) | Focal length |
|---|---|---|---|---|---|---|---|
| 0 | object | infinity | 1000000 | | | | |
| 1 | stop | infinity | −0.006 | | | | |
| 2 | Lens 1 | 2.920 (ASP) | 0.641 | plastic | 1.535 | 56.0 | 3.55 |
| 3 | | −4.773 (ASP) | 0.447 | | | | |
| 4 | Lens 2 | −0.404 (ASP) | 0.246 | plastic | 1.535 | 56.0 | −1.81 |
| 5 | | −0.849 (ASP) | 0.031 | | | | |
| 6 | Lens 3 | 0.737 (ASP) | 1.279 | plastic | 1.535 | 56.0 | 1.37 |
| 7 | | −13.899 (ASP) | 0.438 | | | | |
| 8 | IR band-pass filter | infinity | 0.210 | glass | 1.517 | 64.2 | |

TABLE 11-continued

Embodiment 6
f (focal length) = 2.03 mm, Fno = 1.33, FOV = 78.00 deg.

| surface | | Curvature Radius | Thickness/ gap | Material | Index (nd) | Abbe # (vd) | Focal length |
|---|---|---|---|---|---|---|---|
| 9 | | infinity | 0.5 | | | | |
| 10 | Image plane | infinity | — | | | | |

Note:
reference wavelength is 940 nm

TABLE 12

| | Aspheric Coefficients | | | | | |
|---|---|---|---|---|---|---|
| surface | 2 | 3 | 4 | 5 | 6 | 7 |
| K: | 5.2716E+00 | 2.1445E+01 | −2.7651E+00 | −8.7300E−01 | −8.3705E+00 | −1.4426E+02 |
| A2: | 0.0000E+00 | 0.0000E+00 | 0.0000E+00 | 0.0000E+00 | 0.0000E+00 | 0.0000E+00 |
| A4: | 9.6435E−02 | −8.5606E−02 | −4.0297E−01 | 1.1702E−01 | 1.1936E−01 | 8.0378E−02 |
| A6: | −1.7845E+00 | −1.1697E+00 | −2.7000E+00 | −1.1433E+00 | −4.9267E−02 | −1.1089E−01 |
| A8: | 9.1006E+00 | 5.6335E+00 | 1.3469E+01 | 4.3132E+00 | 4.8564E−03 | 1.5919E−01 |
| A10: | −2.7980E+01 | −1.4317E+01 | −2.6854E+01 | −6.7759E+00 | −2.4469E−02 | −1.0604E−01 |
| A12: | 4.9739E+01 | 1.8812E+01 | 2.7396E+01 | 5.6960E+00 | 5.7198E−03 | 2.9266E−02 |
| A14: | −4.8503E+01 | −1.2536E+01 | −1.3331E+01 | −2.4892E+00 | −2.5052E−03 | −2.9198E−03 |
| A16: | 1.9754E+01 | 3.4738E+00 | 2.2864E+00 | 4.3684E−01 | 0.0000E+00 | 0.0000E+00 |

In the sixth embodiment, the equation of the aspheric surface profiles of the aforementioned lenses is the same as the equation of the first embodiment. Also, the definitions of these parameters shown in the following table are the same as those stated in the first embodiment with corresponding values for the sixth embodiment, so an explanation in this regard will not be provided again.

Moreover, these parameters can be calculated from Table 11 and Table 12 as the following values and satisfy the following conditions:

| Embodiment 6 | | | |
|---|---|---|---|
| f[mm] | 2.03 | CT3/CT2 | 5.20 |
| Fno | 1.33 | FOV/f[deg./mm] | 38.42 |
| FOV[deg.] | 78.00 | FOV/TL[deg./mm] | 20.58 |
| EPD[mm] | 1.52 | HFOV/R3[deg./mm] | −96.66 |
| HFOV/(R6/f)[deg.] | −5.70 | HFOV/R1[deg./mm] | 26.71 |
| R1/R3 | −7.24 | f2*TL/cos(HFOV) [mm²] | −8.82 |
| R2/R3 | 11.83 | f*TL/CT3[mm] | 6.02 |
| R2/R5 | −6.48 | R1/R5 | 3.96 |
| R2/R6 | 0.34 | f3/EPD | 0.90 |
| R2/EPD | −3.14 | f1/f3 | 2.58 |
| R6/f3 | −10.12 | T12/CT2 | 1.82 |
| f2/CT2 | −7.35 | CT1/CT2 | 2.61 |
| f3/CT3 | 1.07 | T23/CT3 | 0.02 |
| CT3/R5 | 1.74 | f1/f2 | −1.96 |
| TD/T23 | 86.37 | | |

Figure 7A:
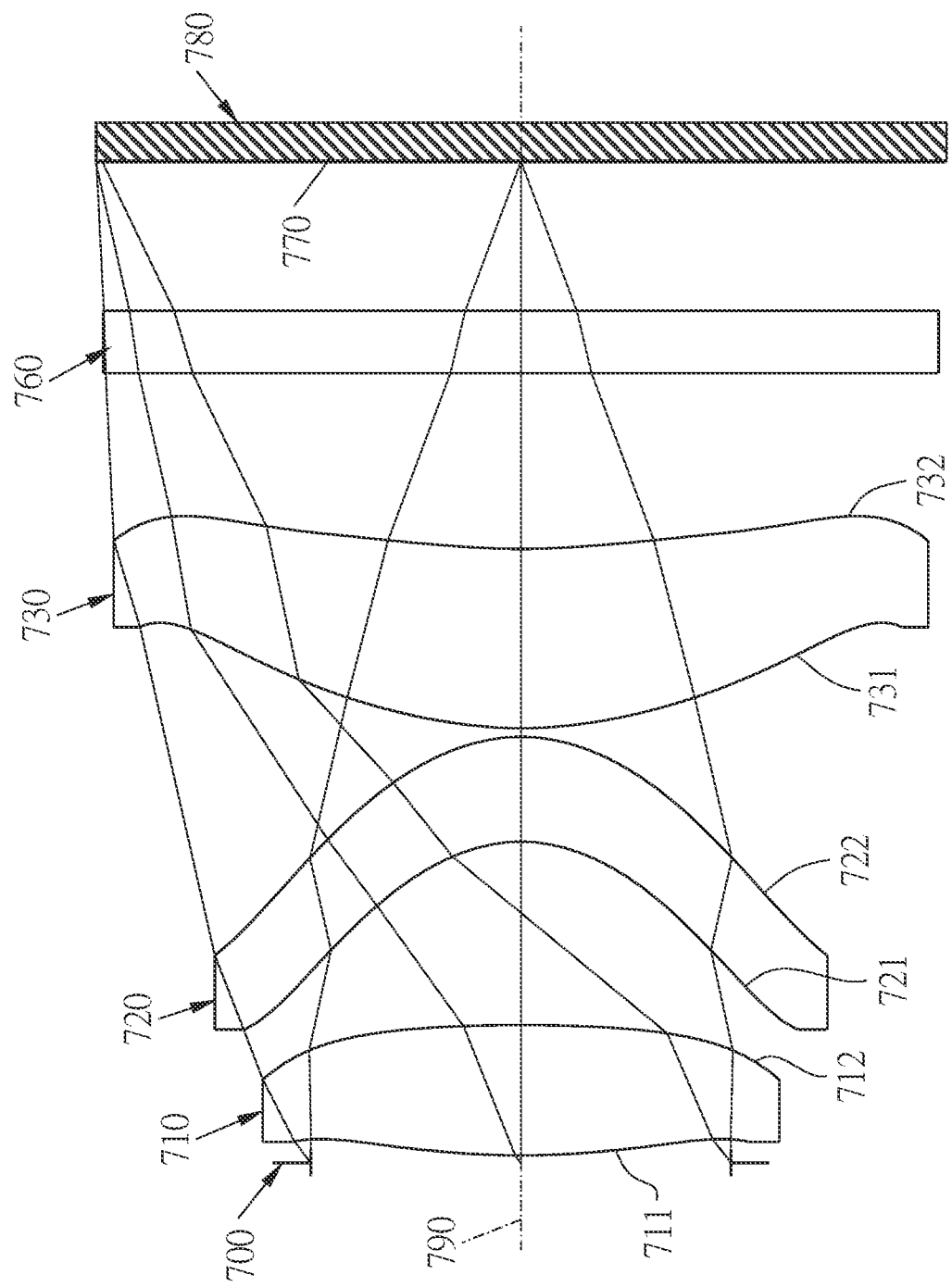
FIG. 7A shows an optical lens assembly in accordance with a seventh embodiment of the present invention.
Figure 7B:
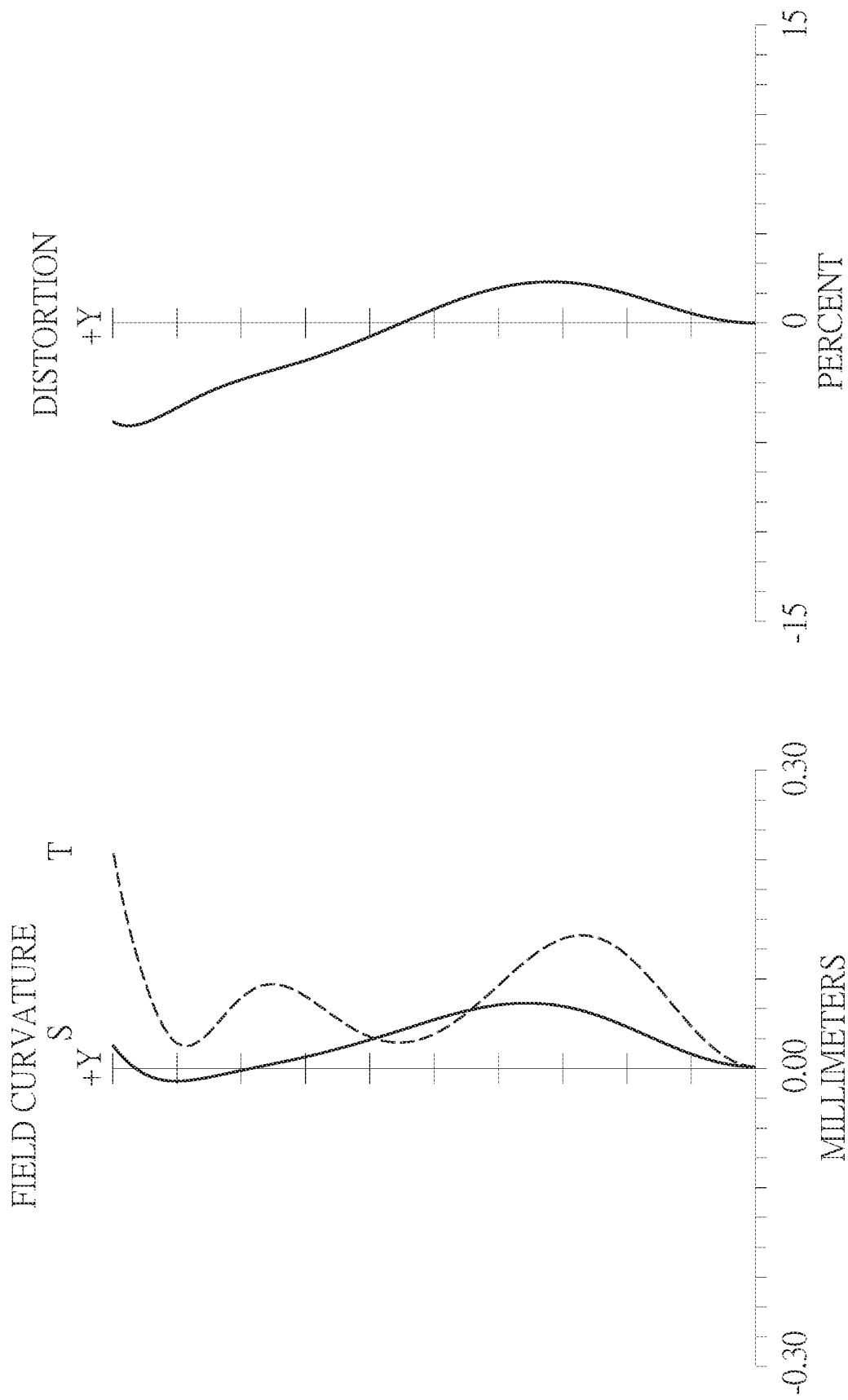
FIG. 7B shows the image plane curve and the distortion curve of the seventh embodiment of the present invention.

Referring to FIGS. 7A and 7B, FIG. 7A shows an optical lens assembly in accordance with a seventh embodiment of the present invention, and FIG. 7B shows, in order from left to right, the image plane curve and the distortion curve of the seventh embodiment of the present invention. An optical lens assembly in accordance with the seventh embodiment of the present invention comprises, in order from an object side to an image side along an optical axis 790: a stop 700, a first lens 710, a second lens 720, a third lens 730, an IR band-pass filter 760, and an image plane 770. The optical lens assembly is provided with an image sensor 780. Wherein the optical lens assembly has a total of three lenses with refractive power, but not limited to this. The stop 700 is disposed between an object and the first lens 710. The image sensor 780 is disposed on the image plane 770.

The first lens 710 with positive refractive power, comprising an object-side surface 711 and an image-side surface 712, the object-side surface 711 of the first lens 710 being convex near the optical axis 790 and the image-side surface 712 of the first lens 710 being convex near the optical axis 790, the object-side surface 711 and the image-side surface 712 of the first lens 710 are aspheric, and the first lens 710 is made of plastic material.

The second lens 720 with positive refractive power, comprising an object-side surface 721 and an image-side surface 722, the object-side surface 721 of the second lens 720 being concave near the optical axis 790 and the image-side surface 722 of the second lens 720 being convex near the optical axis 790, the object-side surface 721 and the image-side surface 722 of the second lens 720 are aspheric, and the second lens 720 is made of plastic material.

The third lens 730 with positive refractive power, comprising an object-side surface 731 and an image-side surface 732, the object-side surface 731 of the third lens 730 being convex near the optical axis 790 and the image-side surface 732 of the third lens 730 being concave near the optical axis 790, the object-side surface 731 and the image-side surface 732 of the third lens 730 are aspheric, and the third lens 730 is made of plastic material.

The IR band-pass filter 760 made of glass is located between the third lens 730 and the image plane 770 and has no influence on the focal length of the optical lens assembly. The present embodiment selects a filter which is available in the light wavelength range of 940 nm±30 nm, but not limited to this.

The detailed optical data of the seventh embodiment is shown in table 13, and the aspheric surface data is shown in table 14.

TABLE 13

Embodiment 7
f (focal length) = 1.95 mm, Fno = 1.32, FOV = 78.03 deg.

| surface | | Curvature Radius | Thickness/gap | Material | Index (nd) | Abbe # (vd) | Focal length |
|---|---|---|---|---|---|---|---|
| 0 | object | infinity | 1000000 | | | | |
| 1 | stop | infinity | 0.025 | | | | |
| 2 | Lens 1 | 3.105 (ASP) | 0.439 | plastic | 1.643 | 22.5 | 3.49 |
| 3 | | −6.694 (ASP) | 0.617 | | | | |
| 4 | Lens 2 | −0.576 (ASP) | 0.353 | plastic | 1.643 | 22.5 | 8.26 |
| 5 | | −0.639 (ASP) | 0.030 | | | | |
| 6 | Lens 3 | 1.605 (ASP) | 0.603 | plastic | 1.643 | 22.5 | 5.25 |
| 7 | | 2.723 (ASP) | 0.592 | | | | |
| 8 | IR band-pass filter | infinity | 0.210 | glass | 1.517 | 64.2 | |
| 9 | | infinity | 0.5 | | | | |
| 10 | Image plane | infinity | — | | | | |

Note:
reference wavelength is 940 nm

TABLE 14

Aspheric Coefficients

| surface | 2 | 3 | 4 | 5 | 6 | 7 |
|---|---|---|---|---|---|---|
| K: | −2.2381E−01 | 1.7818E+01 | −1.1673E+00 | −1.1535E+00 | −1.2991E+01 | −5.2684E+01 |
| A2: | 0.0000E+00 | 0.0000E+00 | 0.0000E+00 | 0.0000E+00 | 0.0000E+00 | 0.0000E+00 |
| A4: | 1.5886E−02 | −7.8908E−02 | 1.8217E−01 | 1.5711E−01 | 1.4796E−01 | −2.6218E−02 |
| A6: | −5.2356E−01 | −1.4575E−01 | −1.4710E+00 | −9.8364E−01 | −1.4674E−01 | −8.8525E−02 |
| A8: | 1.0079E+00 | 2.5329E−01 | 4.7984E+00 | 2.5452E+00 | 1.3294E−01 | 2.9657E−01 |
| A10: | −1.4099E−01 | −8.4282E−02 | −7.5041E+00 | −3.1957E+00 | −6.8933E−02 | −2.7214E−01 |
| A12: | −2.5769E+00 | −6.5448E−01 | 6.0295E+00 | 2.0361E+00 | 1.1058E−02 | 9.9581E−02 |
| A14: | 2.1792E+00 | 5.5033E−01 | −1.8967E+00 | −5.0983E−01 | −4.5686E−04 | −1.3319E−02 |
| A16: | 0.0000E+00 | 0.0000E+00 | 0.0000E+00 | 0.0000E+00 | 0.0000E+00 | 0.0000E+00 |

In the seventh embodiment, the equation of the aspheric surface profiles of the aforementioned lenses is the same as the equation of the first embodiment. Also, the definitions of these parameters shown in the following table are the same as those stated in the first embodiment with corresponding values for the seventh embodiment, so an explanation in this regard will not be provided again.

Moreover, these parameters can be calculated from Table 13 and Table 14 as the following values and satisfy the following conditions:

| Embodiment 7 | | | |
|---|---|---|---|
| f[mm] | 1.95 | CT3/CT2 | 1.71 |
| Fno | 1.32 | FOV/f[deg./mm] | 40.04 |
| FOV[deg.] | 78.03 | FOV/TL[deg./mm] | 23.34 |
| EPD[mm] | 1.48 | HFOV/R3[deg./mm] | −67.69 |
| HFOV/(R6/f)[deg.] | 27.92 | HFOV/R1[deg./mm] | 25.13 |
| R1/R3 | −5.39 | f2*TL/cos(HFOV) [mm$^2$] | 35.56 |
| R2/R3 | 11.61 | f*TL/CT3[mm] | 10.80 |
| R2/R5 | −4.17 | R1/R5 | 1.93 |
| R2/R6 | −2.46 | f3/EPD | 3.55 |
| R2/EPD | −4.52 | f1/f3 | 0.67 |
| R6/f3 | 0.52 | T12/CT2 | 1.75 |
| f2/CT2 | 23.43 | CT1/CT2 | 1.24 |
| f3/CT3 | 8.70 | T23/CT3 | 0.05 |
| CT3/R5 | 0.38 | f1/f2 | 0.42 |
| TD/T23 | 68.25 | | |

Figure 8A:
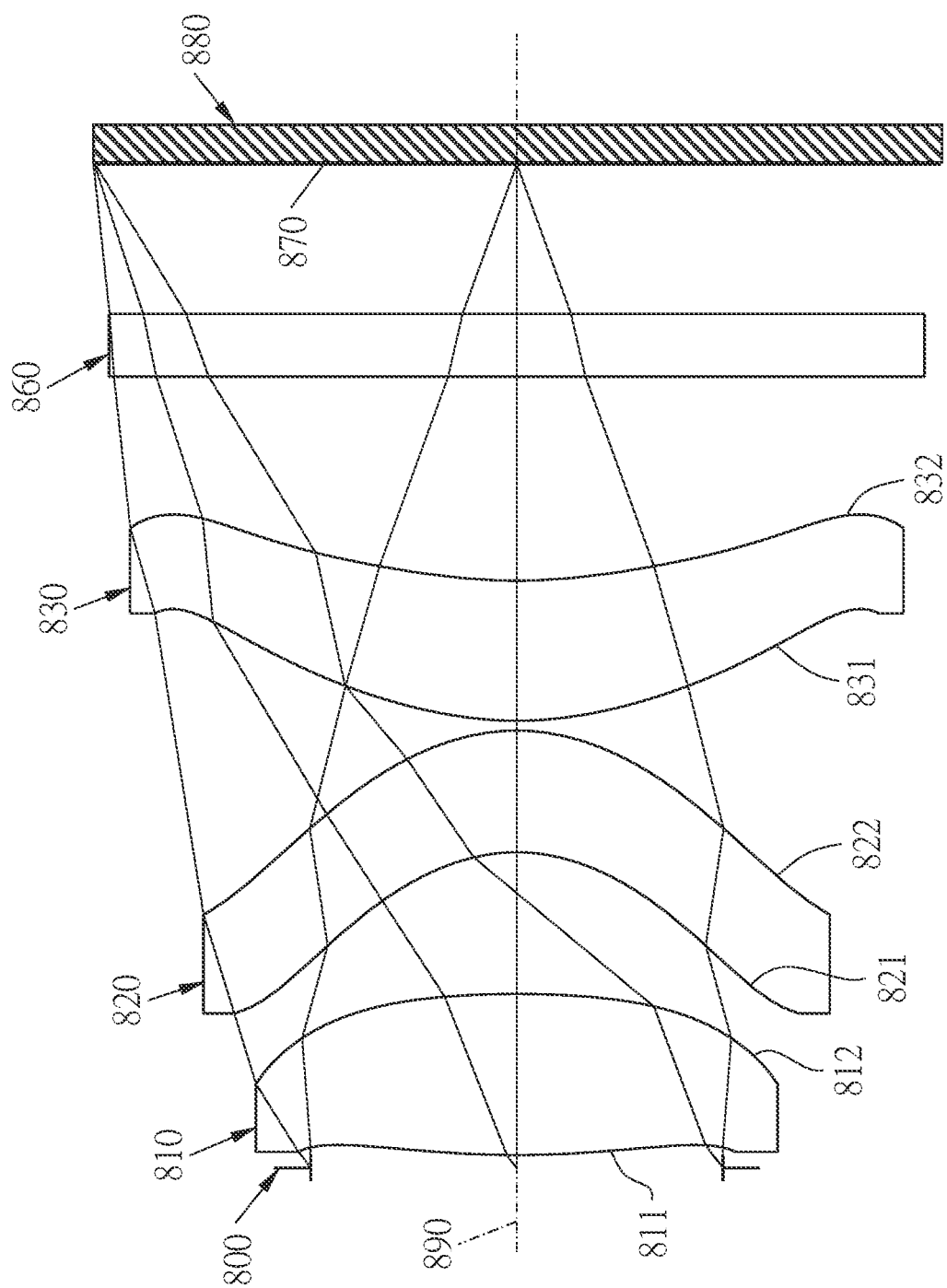
FIG. 8A shows an optical lens assembly in accordance with an eighth embodiment of the present invention.
Figure 8B:
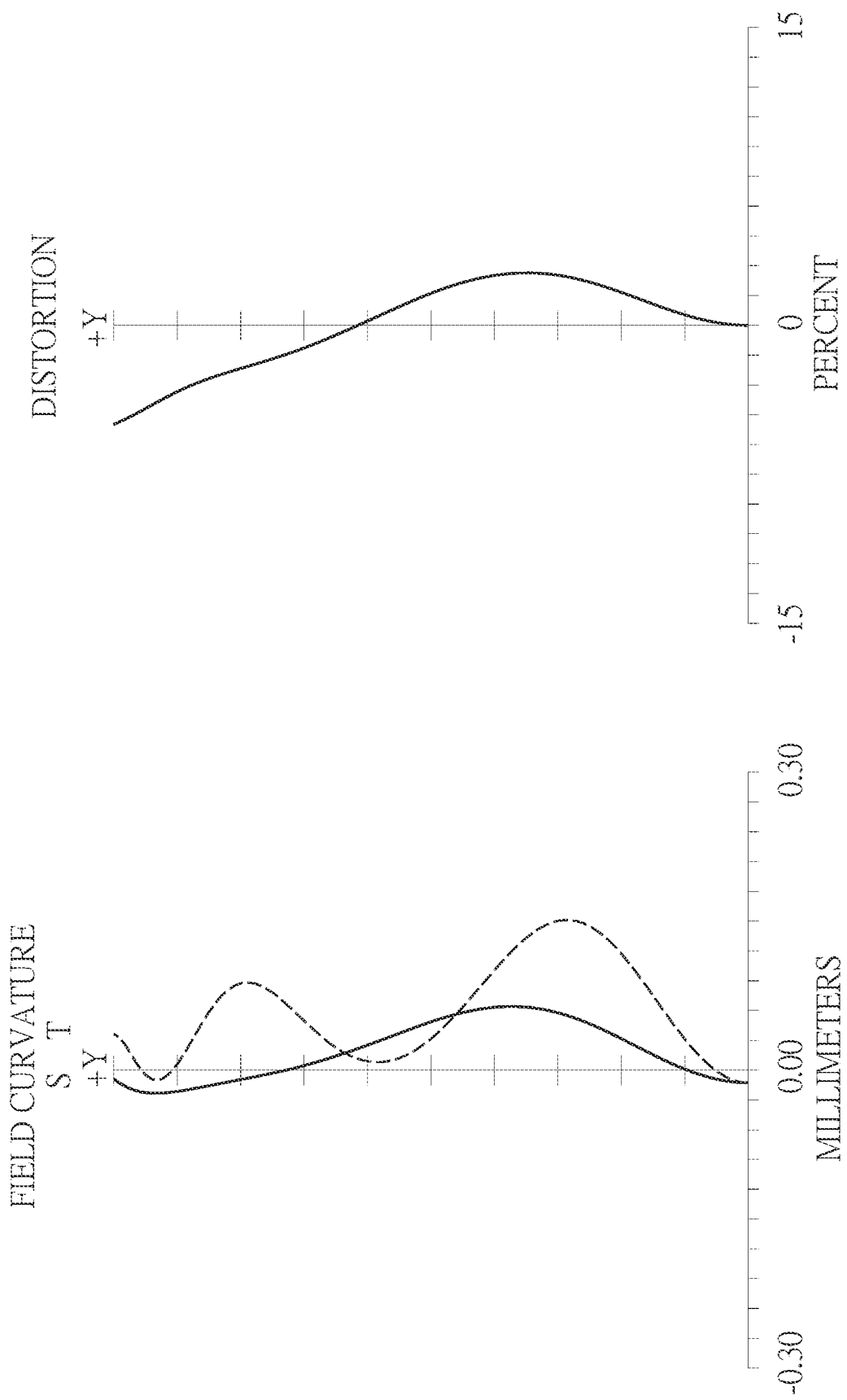
FIG. 8B shows the image plane curve and the distortion curve of the eighth embodiment of the present invention.

Referring to FIGS. 8A and 8B, FIG. 8A shows an optical lens assembly in accordance with an eighth embodiment of the present invention, and FIG. 8B shows, in order from left to right, the image plane curve and the distortion curve of the eighth embodiment of the present invention. An optical lens assembly in accordance with the eighth embodiment of the present invention comprises, in order from an object side to an image side along an optical axis 890: a stop 800, a first lens 810, a second lens 820, a third lens 830, an IR band-pass filter 860, and an image plane 870. The optical lens assembly is provided with an image sensor 880. Wherein the optical lens assembly has a total of three lenses with refractive power, but not limited to this. The stop 800 is disposed between an object and the first lens 810. The image sensor 880 is disposed on the image plane 870.

The first lens 810 with positive refractive power, comprising an object-side surface 811 and an image-side surface 812, the object-side surface 811 of the first lens 810 being convex near the optical axis 890 and the image-side surface 812 of the first lens 810 being convex near the optical axis 890, the object-side surface 811 and the image-side surface 812 of the first lens 810 are aspheric, and the first lens 810 is made of plastic material.

The second lens 820 with positive refractive power, comprising an object-side surface 821 and an image-side surface 822, the object-side surface 821 of the second lens 820 being concave near the optical axis 890 and the image-side surface 822 of the second lens 820 being convex near the optical axis 890, the object-side surface 821 and the image-side surface 822 of the second lens 820 are aspheric, and the second lens 820 is made of plastic material.

The third lens 830 with positive refractive power, comprising an object-side surface 831 and an image-side surface 832, the object-side surface 831 of the third lens 830 being convex near the optical axis 890 and the image-side surface 832 of the third lens 830 being concave near the optical axis 890, the object-side surface 831 and the image-side surface 832 of the third lens 830 are aspheric, and the third lens 830 is made of plastic material.

The IR band-pass filter 860 made of glass is located between the third lens 830 and the image plane 870 and has no influence on the focal length of the optical lens assembly. The present embodiment selects a filter which is available in the light wavelength range of 940 nm±30 nm, but not limited to this.

The detailed optical data of the eighth embodiment is shown in table and the aspheric surface data is shown in table 16.

TABLE 15

Embodiment 8
f (focal length) = 1.95 mm, Fno = 1.33, FOV = 77.93 deg.

| surface | | Curvature Radius | Thickness/ gap | Material | Index (nd) | Abbe # (vd) | Focal length |
|---|---|---|---|---|---|---|---|
| 0 | object | infinity | 1000000 | | | | |
| 1 | stop | infinity | 0.043 | | | | |
| 2 | Lens 1 | 3.690 (ASP) | 0.540 | plastic | 1.643 | 22.5 | 3.06 |
| 3 | | −3.651 (ASP) | 0.474 | | | | |
| 4 | Lens 2 | −0.674 (ASP) | 0.407 | plastic | 1.643 | 22.5 | 15.32 |
| 5 | | −0.775 (ASP) | 0.033 | | | | |
| 6 | Lens 3 | 1.380 (ASP) | 0.470 | plastic | 1.643 | 22.5 | 5.02 |
| 7 | | 2.162 (ASP) | 0.683 | | | | |
| 8 | IR band-pass filter | infinity | 0.210 | glass | 1.517 | 64.2 | |
| 9 | | infinity | 0.5 | | | | |
| 10 | Image plane | infinity | — | | | | |

Note:
reference wavelength is 940 nm

TABLE 16

Aspheric Coefficients

| surface | 2 | 3 | 4 | 5 | 6 | 7 |
|---|---|---|---|---|---|---|
| K: | 3.5356E+00 | 1.3697E+01 | −1.2061E+00 | −1.0289E+00 | −9.6393E+00 | −1.2846E+01 |
| A2: | 0.0000E+00 | 0.0000E+00 | 0.0000E+00 | 0.0000E+00 | 0.0000E+00 | 0.0000E+00 |
| A4: | 5.7511E−03 | −1.0509E−01 | 1.9346E−01 | 1.9061E−01 | 1.5261E−01 | −4.9184E−03 |
| A6: | −7.5268E−01 | −1.5777E−01 | −1.4732E+00 | −9.4238E−01 | −1.5121E−01 | −8.5048E−02 |
| A8: | 1.1914E+00 | 3.0742E−01 | 4.7964E+00 | 2.5336E+00 | 1.3628E−01 | 2.9279E−01 |
| A10: | 2.7615E−01 | −9.6113E−02 | −7.5021E+00 | −3.2131E+00 | −7.0582E−02 | −2.7508E−01 |
| A12: | −2.4916E+00 | −5.6947E−01 | 6.0302E+00 | 2.0234E+00 | 1.3222E−02 | 9.8879E−02 |
| A14: | 9.5687E−01 | 5.0012E−01 | −1.9107E+00 | −4.9940E−01 | −2.8596E−03 | −1.2758E−02 |
| A16: | 0.0000E+00 | 0.0000E+00 | 0.0000E+00 | 0.0000E+00 | 0.0000E+00 | 0.0000E+00 |

In the eighth embodiment, the equation of the aspheric surface profiles of the aforementioned lenses is the same as the equation of the first embodiment. Also, the definitions of these parameters shown in the following table are the same as those stated in the first embodiment with corresponding values for the eighth embodiment, so an explanation in this regard will not be provided again.

Moreover, these parameters can be calculated from Table 15 and Table 16 as the following values and satisfy the following conditions:

| Embodiment 8 | | | |
|---|---|---|---|
| f[mm] | 1.95 | CT3/CT2 | 1.15 |
| Fno | 1.33 | FOV/f[deg./mm] | 40.06 |
| FOV[deg.] | 77.93 | FOV/TL[deg./mm] | 23.49 |
| EPD[mm] | 1.46 | HFOV/R3[deg./mm] | −57.80 |
| HFOV/(R6/f)[deg.] | 35.06 | HFOV/R1[deg./mm] | 21.12 |
| R1/R3 | −5.47 | f2*TL/cos(HFOV) [mm$^2$] | 65.36 |
| R2/R3 | 5.41 | f*TL/CT3[mm] | 13.73 |
| R2/R5 | −2.65 | R1/R5 | 2.67 |
| R2/R6 | −1.69 | f3/EPD | 3.43 |
| R2/EPD | −2.49 | f1/f3 | 0.61 |
| R6/f3 | 0.43 | T12/CT2 | 1.17 |
| f2/CT2 | 37.63 | CT1/CT2 | 1.33 |
| f3/CT3 | 10.67 | T23/CT3 | 0.07 |
| CT3/R5 | 0.34 | f1/f2 | 0.20 |
| TD/T23 | 58.62 | | |

Figure 9A:
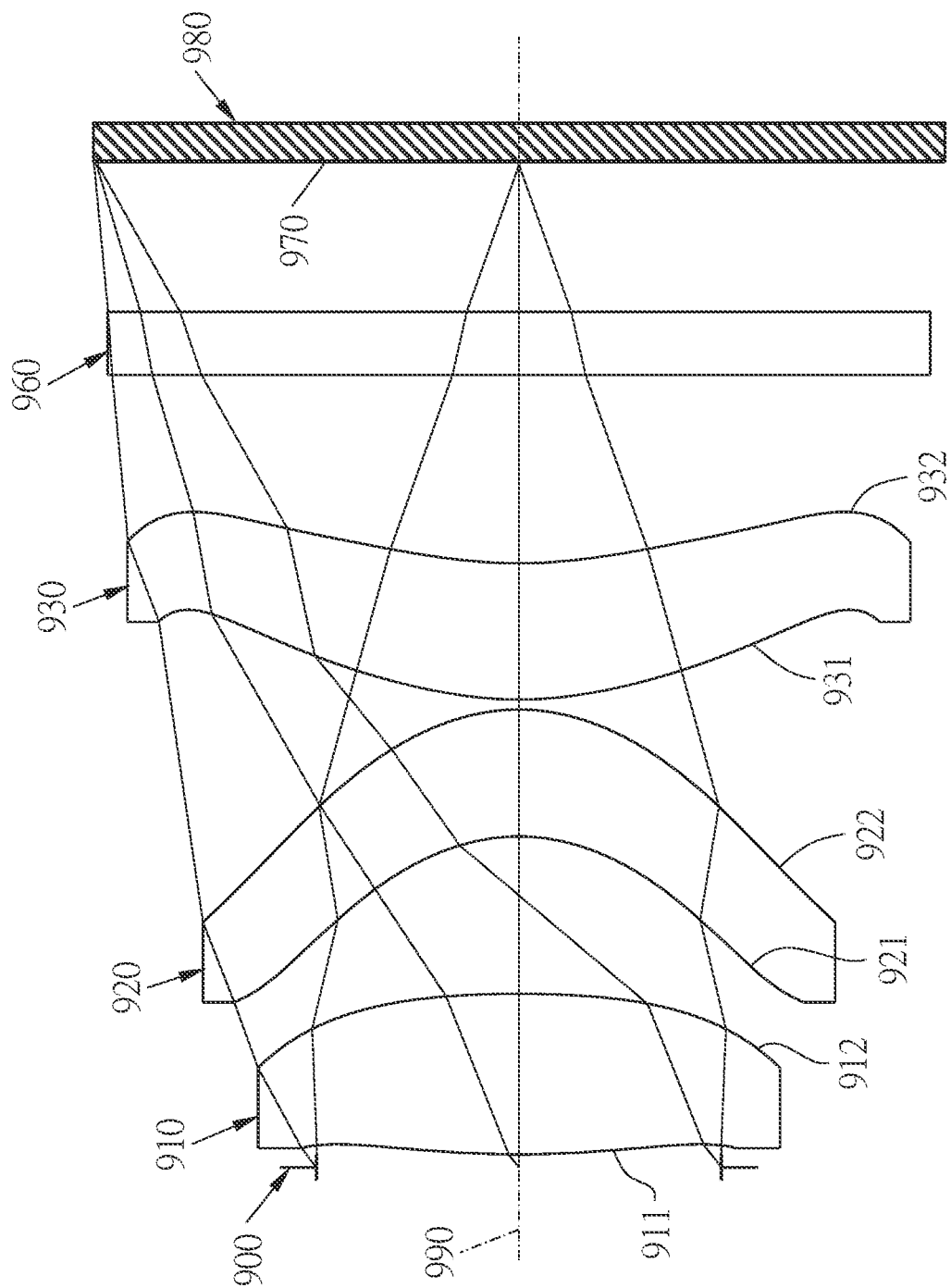
FIG. 9A shows an optical lens assembly in accordance with a ninth embodiment of the present invention.
Figure 9B:
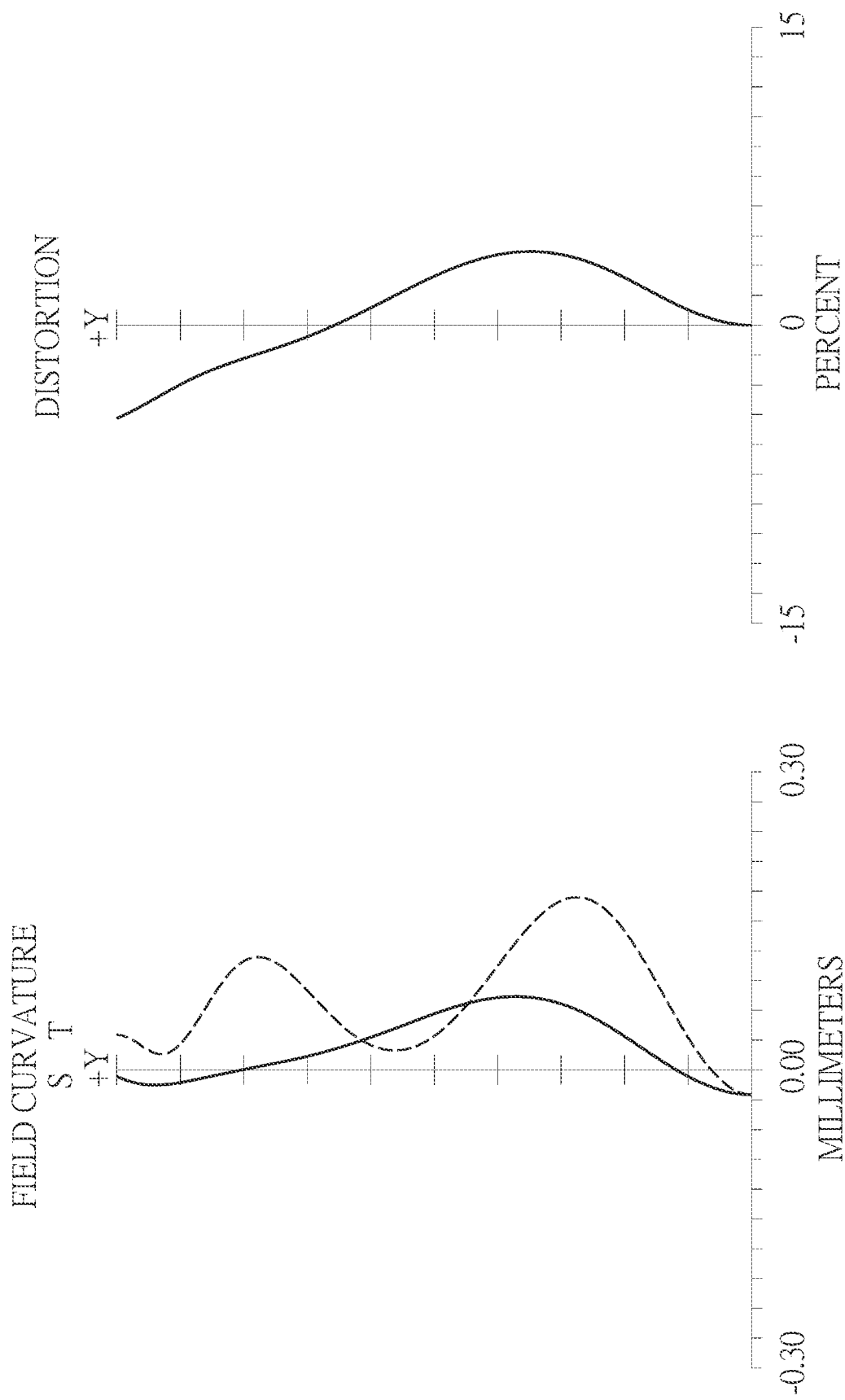
FIG. 9B shows the image plane curve and the distortion curve of the ninth embodiment of the present invention.

Referring to FIGS. 9A and 9B, FIG. 9A shows an optical lens assembly in accordance with a ninth embodiment of the present invention, and FIG. 9B shows, in order from left to right, the image plane curve and the distortion curve of the ninth embodiment of the present invention. An optical lens assembly in accordance with the ninth embodiment of the present invention comprises, in order from an object side to an image side along an optical axis 990: a stop 900, a first lens 910, a second lens 920, a third lens 930, an IR band-pass filter 960, and an image plane 970. The optical lens assembly is provided with an image sensor 980. Wherein the optical lens assembly has a total of three lenses with refractive power, but not limited to this. The stop 900 is disposed between an object and the first lens 910. The image sensor 980 is disposed on the image plane 970.

The first lens 910 with positive refractive power, comprising an object-side surface 911 and an image-side surface 912, the object-side surface 911 of the first lens 910 being convex near the optical axis 990 and the image-side surface 912 of the first lens 910 being convex near the optical axis 990, the object-side surface 911 and the image-side surface 912 of the first lens 910 are aspheric, and the first lens 910 is made of plastic material.

The second lens 920 with positive refractive power, comprising an object-side surface 921 and an image-side surface 922, the object-side surface 921 of the second lens 920 being concave near the optical axis 990 and the image-side surface 922 of the second lens 920 being convex near the optical axis 990, the object-side surface 921 and the image-side surface 922 of the second lens 920 are aspheric, and the second lens 920 is made of plastic material.

The third lens 930 with positive refractive power, comprising an object-side surface 931 and an image-side surface 932, the object-side surface 931 of the third lens 930 being convex near the optical axis 990 and the image-side surface 932 of the third lens 930 being concave near the optical axis 990, the object-side surface 931 and the image-side surface 932 of the third lens 930 are aspheric, and the third lens 930 is made of plastic material.

The IR band-pass filter 960 made of glass is located between the third lens 930 and the image plane 970 and has no influence on the focal length of the optical lens assembly. The present embodiment selects a filter which is available in the light wavelength range of 940 nm±30 nm, but not limited to this.

The detailed optical data of the ninth embodiment is shown in table 17, and the aspheric surface data is shown in table 18.

TABLE 17

Embodiment 9
f (focal length) = 1.91 mm, Fno = 1.33, FOV = 78.65 deg.

| surface | | Curvature Radius | Thickness/ gap | Material | Index (nd) | Abbe # (vd) | Focal length |
|---|---|---|---|---|---|---|---|
| 0 | object | infinity | 1000000 | | | | |
| 1 | stop | infinity | 0.044 | | | | |
| 2 | Lens 1 | 3.907 (ASP) | 0.537 | plastic | 1.643 | 22.5 | 3.18 |
| 3 | | −3.744 (ASP) | 0.525 | | | | |
| 4 | Lens 2 | −0.726 (ASP) | 0.425 | plastic | 1.643 | 22.5 | 6.17 |
| 5 | | −0.746 (ASP) | 0.033 | | | | |
| 6 | Lens 3 | 1.417 (ASP) | 0.456 | plastic | 1.643 | 22.5 | 7.54 |
| 7 | | 1.788 (ASP) | 0.630 | | | | |
| 8 | IR band-pass filter | infinity | 0.210 | glass | 1.517 | 64.2 | |
| 9 | | infinity | 0.5 | | | | |
| 10 | Image plane | infinity | — | | | | |

Note:
reference wavelength is 940 nm

TABLE 18

Aspheric Coefficients

| surface | 2 | 3 | 4 | 5 | 6 | 7 |
|---|---|---|---|---|---|---|
| K: | 5.4514E+00 | 1.4249E+01 | −1.1114E+00 | −1.0146E+00 | −1.2783E+01 | −1.2840E+01 |
| A2: | 0.0000E+00 | 0.0000E+00 | 0.0000E+00 | 0.0000E+00 | 0.0000E+00 | 0.0000E+00 |
| A4: | −5.6314E−03 | −7.4749E−02 | 1.6910E−01 | 1.8633E−01 | 1.4184E−01 | −4.2204E−02 |
| A6: | −6.2443E−01 | −1.5597E−01 | −1.4813E+00 | −9.7365E−01 | −1.5800E−01 | −8.7357E−02 |
| A8: | 1.0864E+00 | 3.1853E−01 | 4.7987E+00 | 2.5266E+00 | 1.3449E−01 | 2.9479E−01 |
| A10: | 3.2490E−02 | −8.7311E−02 | −7.5022E+00 | −3.2040E+00 | −6.6557E−02 | −2.7416E−01 |
| A12: | −2.5291E+00 | −5.9049E−01 | 6.0267E+00 | 2.0298E+00 | 1.2103E−02 | 9.9845E−02 |
| A14: | 1.7222E+00 | 5.5374E−01 | −1.9051E+00 | −5.0356E−01 | −3.7195E−03 | −1.3366E−02 |
| A16: | 0.0000E+00 | 0.0000E+00 | 0.0000E+00 | 0.0000E+00 | 0.0000E+00 | 0.0000E+00 |

In the ninth embodiment, the equation of the aspheric surface profiles of the aforementioned lenses is the same as the equation of the first embodiment. Also, the definitions of these parameters shown in the following table are the same as those stated in the first embodiment with corresponding values for the ninth embodiment, so an explanation in this regard will not be provided again.

Moreover, these parameters can be calculated from Table 17 and Table 18 as the following values and satisfy the following conditions:

| Embodiment 9 | | | |
|---|---|---|---|
| f[mm] | 1.91 | CT3/CT2 | 1.07 |
| Fno | 1.33 | FOV/f[deg./mm] | 41.19 |
| FOV[deg.] | 78.65 | FOV/TL[deg./mm] | 23.73 |
| EPD[mm] | 1.43 | HFOV/R3[deg./mm] | −54.16 |
| HFOV/(R6/f)[deg.] | 42.00 | HFOV/R1[deg./mm] | 20.13 |
| R1/R3 | −5.38 | f2*TL/cos(HFOV) [mm$^2$] | 26.44 |
| R2/R3 | 5.16 | PTL/CT3[mm] | 13.89 |
| R2/R5 | −2.64 | R1/R5 | 2.76 |
| R2/R6 | −2.09 | f3/EPD | 5.26 |
| R2/EPD | −2.61 | f1/f3 | 0.42 |
| R6/3 | 0.24 | T12/CT2 | 1.24 |
| f2/CT2 | 14.52 | CT1/CT2 | 1.26 |
| f3/CT3 | 16.54 | T23/CT3 | 0.07 |
| CT3/R5 | 0.32 | f1/f2 | 0.52 |
| TD/T23 | 60.76 | | |

Figure 10:
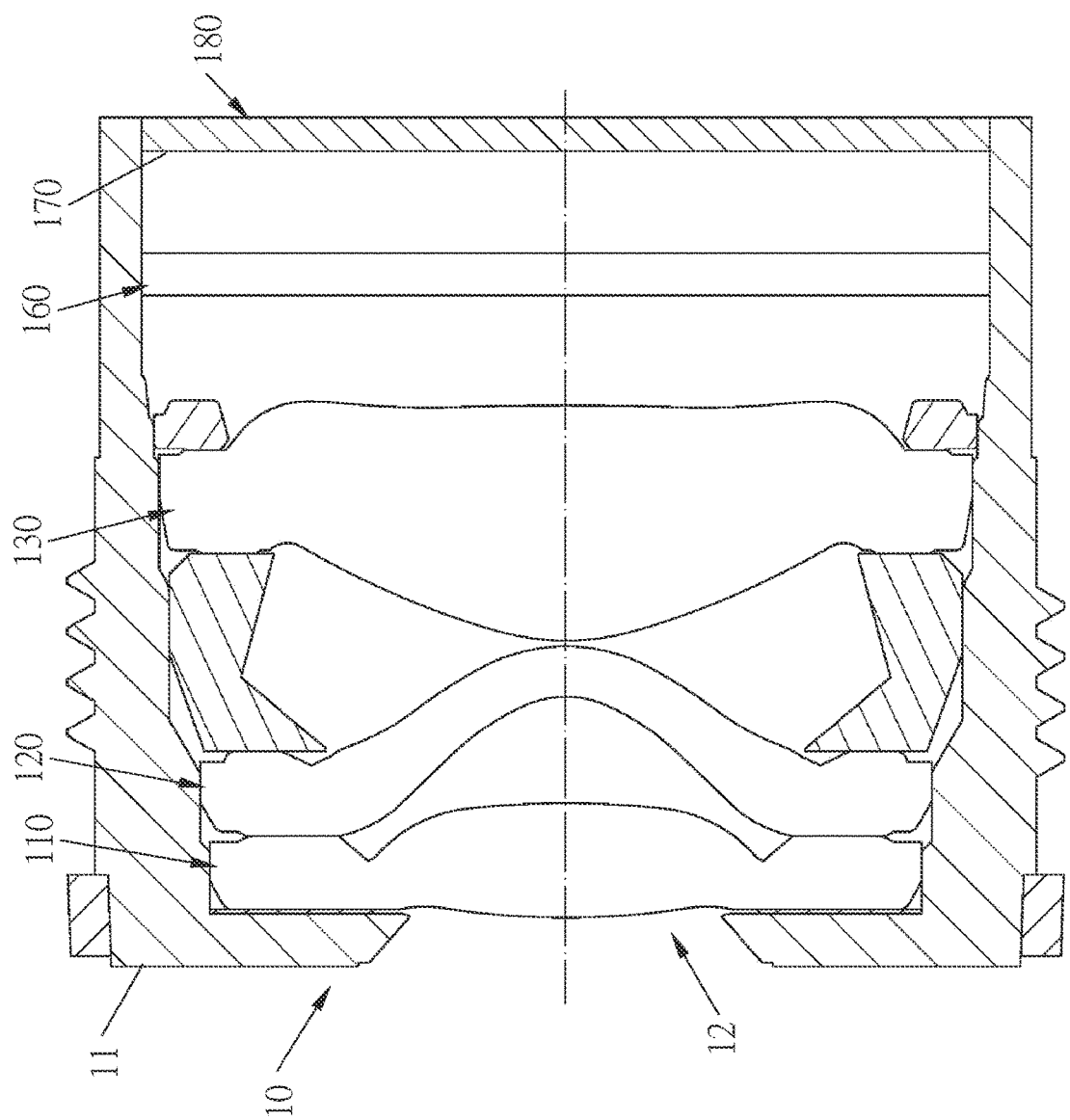
FIG. 10 shows a photographing module in accordance with a tenth embodiment of the present invention.

Referring to FIG. 10, which shows a photographing module in accordance with a tenth embodiment of the present invention, the photographing module 10 is applied to a notebook, but not limited to this. The photographing module 10 includes a lens barrel 11, an optical lens assembly 12 and an image sensor 180. The optical lens assembly 12 is the optical lens assembly of the above first embodiment, but not limited to this, and can also be the optical lens assemblies of the other embodiments. In addition, the lenses of the optical lens assembly in FIG. 10 show the unlit peripheral parts, which is slightly different from that of the first embodiment. The lens barrel 11 is provided for accommodating the optical lens assembly 12. The image sensor 180 is disposed on an image plane 170 of the optical lens assembly and is an electronic sensor (such as, CMOS, CCD) with good brightness and low noise to really present the imaging quality of the optical lens assembly.

In the present optical lens assembly, the lenses can be made of plastic or glass. If the lenses are made of plastic, the cost will be effectively reduced. If the lenses are made of glass, there is more freedom in distributing the refractive power of the optical lens assembly. Plastic lenses can have aspheric surfaces, which allow more design parameter freedom (than spherical surfaces), so as to improve the adjustment of the surface shapes of the lenses, reduce the aberration and the number of the lenses, as well as the total length of the optical lens assembly.

In the present optical lens assembly, if the object-side or the image-side surface of the lenses with refractive power is convex and the location of the convex surface is not defined, the object-side or the image-side surface of the lenses near the optical axis is convex. If the object-side or the image-side surface of the lenses is concave and the location of the concave surface is not defined, the object-side or the image-side surface of the lenses near the optical axis is concave.

The optical lens assembly of the present invention can be used in focusing optical systems and can obtain better image quality. The optical lens assembly of the present invention can also be used in electronic imaging systems, such as, 3D image capturing, digital camera, mobile device, digital flat panel or vehicle camera.

While we have shown and described various embodiments in accordance with the present invention, it should be clear to those skilled in the art that further embodiments may be made without departing from the scope of the present invention.

What is claimed is:

1. An optical lens assembly, in order from an object side to an image side, comprising:
   a stop;
   a first lens with positive refractive power, comprising an object-side surface and an image-side surface, the object-side surface of the first lens being convex near an optical axis and the image-side surface of the first lens being convex near the optical axis, and the object-side surface and the image-side surface of the first lens being aspheric;
   a second lens with refractive power, comprising an object-side surface and an image-side surface, the object-side surface of the second lens being concave near the optical axis and the image-side surface of the second lens being convex near the optical axis, and the object-side surface and the image-side surface of the second lens being aspheric;
   a third lens with positive refractive power, comprising an object-side surface and an image-side surface, the object-side surface of the third lens being convex near the optical axis, and the object-side surface and the image-side surface of the third lens being aspheric; and
   an IR band-pass filter;
   wherein half of a maximum view angle (field of view) of the optical lens assembly is HFOV, a radius of curvature of the image-side surface of the third lens is R6, a focal length of the optical lens assembly is f, a radius of curvature of the image-side surface of the first lens is R2, an entrance pupil diameter of the optical lens assembly is EPD, and following conditions are condition is satisfied: −6.83°<HFOV/(R6/f)≤11.97° and −10.42<R2/EPD<−2.00, or 27.92°≤HFOV/(R6/f) ≤35.06°) and −10.42<R2/EPD<−2.00.

2. The optical lens assembly as claimed in claim 1, wherein a radius of curvature of the object-side surface of the first lens is R1, a radius of curvature of the object-side surface of the second lens is R3, and following condition is satisfied: −8.68<R1/R3<−3.67.

3. The optical lens assembly as claimed in claim 1, wherein the radius of curvature of the image-side surface of the first lens is R2, a radius of curvature of the object-side surface of the second lens is R3, and following condition is satisfied: 4.12<R2/R3<30.18.

4. The optical lens assembly as claimed in claim 1, wherein a focal length of the second lens is f2, a central thickness of the second lens along the optical axis is CT2, and following condition is satisfied: −11.48<f2/CT2<30.11.

5. The optical lens assembly as claimed in claim 1, wherein a central thickness of the third lens along the optical axis is CT3, a radius of curvature of the object-side surface of the third lens is R5, and following condition is satisfied: 0.26<CT3/R5<2.08.

6. The optical lens assembly as claimed in claim 1, wherein a distance from the object-side surface of the first lens to the image-side surface of the third lens along the optical axis is TD, a distance from the image-side surface of the second lens to the object-side surface of the third lens along the optical axis is T23, and following condition is satisfied: 46.90<TD/T23<103.89.

7. The optical lens assembly as claimed in claim 1, wherein the optical lens assembly has the maximum view angle (field of view) FOV, the focal length of the optical lens assembly is f, and following condition is satisfied: 30.09°/mm<FOV/f<49.43°/mm.

8. The optical lens assembly as claimed in claim 1, wherein half of the maximum view angle (field of view) of the optical lens assembly is HFOV, a radius of curvature of the object-side surface of the second lens is R3, and following condition is satisfied: −115.99°/mm<HFOV/R3<−43.33°/mm.

9. The optical lens assembly as claimed in claim 1, wherein the focal length of the optical lens assembly is f, a distance from the object-side surface of the first lens to an image plane along the optical axis is TL, a central thickness of the third lens along the optical axis is CT3, and following condition is satisfied: 4.81 mm<f*TL/CT3<16.67 mm.

10. The optical lens assembly as claimed in claim 1, wherein the radius of curvature of the image-side surface of the first lens is R2, the radius of curvature of the image-side surface of the third lens is R6, and following condition is satisfied: −2.95<R2/R6<0.55.

11. The optical lens assembly as claimed in claim 1, wherein the radius of curvature of the image-side surface of the third lens is R6, a focal length of the third lens is f3, and following condition is satisfied: −24.08<R6/f3<196.86.

12. The optical lens assembly as claimed in claim 1, wherein a focal length of the third lens is f3, a central thickness of the third lens along the optical axis is CT3, and following condition is satisfied: 0.00<f3/CT3<19.85.

13. The optical lens assembly as claimed in claim 1, wherein a central thickness of the third lens along the optical axis is CT3, a central thickness of the second lens along the optical axis is CT2, and following condition is satisfied: 0.86<CT3/CT2<6.25.

14. The optical lens assembly as claimed in claim 1, wherein the optical lens assembly has the maximum view angle (field of view) FOV, a distance from the object-side surface of the first lens to an image plane along the optical axis is TL, and following condition is satisfied: 16.46°/mm<F0V/TL<28.47°/mm.

15. The optical lens assembly as claimed in claim 1, wherein half of the maximum view angle (field of view) of the optical lens assembly is HFOV, a radius of curvature of the object-side surface of the first lens is R1, and following condition is satisfied: 16.11°/mm<HFOV/R1<40.24°/mm.

16. The optical lens assembly as claimed in claim 1, wherein a focal length of the second lens is f2, a distance from the object-side surface of the first lens to an image plane along the optical axis is TL, half of the maximum view angle (field of view) of the optical lens assembly is HFOV, and following condition is satisfied: −12.36 mm²<f2*TL/cos(HFOV)<78.43 mm².

17. A photographing module, comprising:
a lens barrel,
an optical lens assembly disposed in the lens barrel, and
an image sensor disposed on an image plane of the optical lens assembly,
wherein the optical lens assembly, in order from an object side to an image side,
comprising:
a stop;
a first lens with positive refractive power, comprising an object-side surface and an image-side surface, the object-side surface of the first lens being convex near an optical axis and the image-side surface of the first lens being convex near the optical axis, and the object-side surface and the image-side surface of the first lens being aspheric;
a second lens with refractive power, comprising an object-side surface and an image-side surface, the object-side surface of the second lens being concave near the optical axis and the image-side surface of the second lens being convex near the optical axis, and the object-side surface and the image-side surface of the second lens being aspheric;
a third lens with positive refractive power, comprising an object-side surface and an image-side surface, the object-side surface of the third lens being convex near the optical axis, and the object-side surface and the image-side surface of the third lens being aspheric; and
an IR band-pass filter;
wherein half of a maximum view angle (field of view) of the optical lens assembly is HFOV, a radius of curvature of the image-side surface of the third lens is R6, a focal length of the optical lens assembly is f, a radius of curvature of the image-side surface of the first lens is R2, an entrance pupil diameter of the optical lens assembly is EPD, and following conditions are satisfied: −6.83°<HFOV/(R6/f)≤11.97° and −10.42<R2/EPD<−2.00, or 27.92°≤HFOV/(R6/f)≤35.06° and −10.42<R2/EPD<−2.00.

18. The photographing module as claimed in claim 17, wherein the focal length of the optical lens assembly is f, a distance from the object-side surface of the first lens to the image plane along the optical axis is TL, a central thickness of the third lens along the optical axis is CT3, and following condition is satisfied: 4.81 mm<f*TL/CT3<16.67 mm.

19. The photographing module as claimed in claim 18, wherein a focal length of the second lens is f2, the distance from the object-side surface of the first lens to the image plane along the optical axis is TL, half of the maximum view angle (field of view) of the optical lens assembly is HFOV, and following condition is satisfied: −12.36 mm²<f2*TL/cos(HFOV)<78.43 mm².

* * * * *